(12) United States Patent
Tomomatsu et al.

(10) Patent No.: US 12,339,445 B2
(45) Date of Patent: Jun. 24, 2025

(54) IMAGE DISPLAY DEVICE AND HEAD-UP DISPLAY EQUIPPED WITH IMAGE DISPLAY DEVICE AND VEHICLE

(71) Applicant: Panasonic Intellectual Property Management Co., Ltd., Osaka (JP)

(72) Inventors: Shunsuke Tomomatsu, Osaka (JP); Yosuke Asai, Osaka (JP); Hiroshi Yamaguchi, Osaka (JP)

(73) Assignee: PANASONIC AUTOMOTIVE SYSTEMS CO., LTD., Osaka (JP)

( * ) Notice: Subject to any disclaimer, the term of this patent is extended or adjusted under 35 U.S.C. 154(b) by 915 days.

(21) Appl. No.: 17/389,957

(22) Filed: Jul. 30, 2021

(65) Prior Publication Data

US 2021/0373328 A1 Dec. 2, 2021

Related U.S. Application Data

(63) Continuation of application No. PCT/JP2020/003661, filed on Jan. 31, 2020.

(30) Foreign Application Priority Data

Jan. 31, 2019 (JP) ................................. 2019-016226

(51) Int. Cl.
*G02B 27/01* (2006.01)
*B60K 35/00* (2024.01)
*B60K 35/23* (2024.01)

(52) U.S. Cl.
CPC .......... *G02B 27/0101* (2013.01); *B60K 35/00* (2013.01); *B60K 35/23* (2024.01); *B60K 2360/23* (2024.01); *G02B 2027/013* (2013.01)

(58) Field of Classification Search
CPC .... G02B 27/01–0189; G02B 2027/0105–0198
See application file for complete search history.

(56) References Cited

U.S. PATENT DOCUMENTS

2004/0130882 A1 7/2004 Hara et al.
2007/0133228 A1 6/2007 Chen
(Continued)

FOREIGN PATENT DOCUMENTS

JP 2001-307527 11/2001
JP 2002-289023 10/2002
(Continued)

OTHER PUBLICATIONS

Extended European Search Report issued Feb. 15, 2022 in corresponding European Patent Application No. 20749387.5.
(Continued)

*Primary Examiner* — Christopher A Lamb, II
(74) *Attorney, Agent, or Firm* — WENDEROTH, LIND & PONACK, L.L.P.

(57) ABSTRACT

An image display device includes a light source unit, a display panel configured to display an image, and a light guide panel configured to guide light emitted from the light source unit to the display panel. The light guide panel has an incident surface facing the light source unit, an output surface facing the display panel, and a bottom surface facing the output surface on a side opposite to the display panel. The incident surface is a side surface of the light guide panel located between the output surface and the bottom surface. The incident surface has a concave portion in which a part of the incident surface is recessed from remaining portions when viewed from a direction perpendicular to a light guide direction of light in the incident surface and an emission direction of light in the output surface.

18 Claims, 14 Drawing Sheets

(56) References Cited

U.S. PATENT DOCUMENTS

| | | | |
|---|---|---|---|
| 2010/0182799 A1 | 7/2010 | Tanahashi | |
| 2012/0195063 A1* | 8/2012 | Kim | G02B 6/0055 |
| | | | 362/602 |
| 2016/0187559 A1* | 6/2016 | Li | G02B 6/002 |
| | | | 362/609 |
| 2016/0327722 A1* | 11/2016 | Chen | G02B 27/0172 |
| 2017/0357041 A1 | 12/2017 | Onoda et al. | |
| 2018/0074247 A1 | 3/2018 | Asakawa et al. | |
| 2018/0259773 A1 | 9/2018 | Asai | |
| 2019/0162960 A1* | 5/2019 | Harada | G02B 27/0101 |

FOREIGN PATENT DOCUMENTS

| | | |
|---|---|---|
| JP | 2005-129271 | 5/2005 |
| JP | 2007-165289 | 6/2007 |
| JP | 2010/165572 | 7/2010 |
| JP | 2017-220418 | 12/2017 |
| JP | 2017-224558 | 12/2017 |
| JP | 2018-045778 | 3/2018 |
| WO | 2017/094209 | 6/2017 |

OTHER PUBLICATIONS

International Preliminary Report on Patentability dated Aug. 5, 2021 in International (PCT) Application No. PCT/JP2020/003661.
International Search Report issued Apr. 14, 2020 in International (PCT) Application No. PCT/JP2020/003661 with English translation.

* cited by examiner

IMAGE DISPLAY DEVICE AND HEAD-UP DISPLAY EQUIPPED WITH IMAGE DISPLAY DEVICE AND VEHICLE

CROSS-REFERENCE TO RELATED APPLICATIONS

This is a continuation application of International Application No. PCT/JP2020/003661, with an international filing date of Jan. 31, 2020, which claims priority of Japanese Patent Application No. 2019-016226 filed on Jan. 31, 2019, the content of which is incorporated herein by reference.

TECHNICAL FIELD

The present disclosure relates to an image display device using a light guide plate and a head-up display equipped with this image display device.

BACKGROUND

In WO 2017/094209 A, a light beam emitted from a light source is guided to a display panel using a light guide plate. Two types of inclined surfaces are formed so as to face an incident surface of the light guide plate. The light beam that goes straight from the light source and is incident on the inclined surface is reflected in the light guide plate while being changed in an angle.

SUMMARY

When two types of inclined surfaces are formed so as to face the incident surface, the thickness of the light guide plate is increased and the chance of light being reflected by the bottom surface of the light guide plate is reduced, so that the amount of light emitted from the output surface is reduced.

The present disclosure provides an image display device increased in an amount of light, a head-up display equipped with the image display device, and a vehicle.

An image display device in the present disclosure includes a light source unit that irradiates light, a display panel that displays image, and a light guide panel that guides the light emitted from the light source unit to the display panel. The light guide panel has an incident surface facing the light source unit, an output surface facing the display panel, and a bottom surface facing the output surface on a side opposite to the display panel. The incident surface of the light guide panel is a side surface of the light guide panel, and is located between the output surface and the bottom surface. The incident surface of the light guide panel has a concave portion, having a predetermined length facing a center of a light emitting surface of the light source unit, in which a part of the incident surface is recessed from remaining portions when viewed from a direction perpendicular to a light guide direction of light in the incident surface and an emission direction in the output surface.

An image display device in the present disclosure includes a light source unit that irradiates light, a display panel that displays image, and a light guide panel that guides the light emitted from the light source unit to the display panel. The light guide panel has an incident surface facing the light source unit, an output surface facing the display panel, and a bottom surface facing the output surface on a side opposite to the display panel. The bottom surface has a first main surface closer to the incident surface, and a second main surface farther from the incident surface than the first main surface. The first main surface and the second main surface are inclined with respect to the output surface, and a first angle between the first main surface and the output surface is larger than a second angle between the second main surface and the output surface.

It is possible to provide the image display device increased in the amount of light, the head-up display equipped with the image display device, and the vehicle.

DETAILED DESCRIPTION

Embodiments will be described in detail below with reference to the drawings as appropriate. However, more detailed description than necessary may be omitted. For example, detailed description of already well-known matters and redundant description of substantially the same configuration may be omitted. This is to avoid the following description from becoming unnecessary redundant and to facilitate understanding by those skilled in the art.

In addition, the inventor(s) provides the accompanying drawings and the following description to enable those skilled in the art to sufficiently understand the present disclosure, which does not intend to limit the claimed subject matter.

First Embodiment

Hereinafter, an image display device according to the present embodiment of the present disclosure will be described with reference to FIGS. 1 to 12.

[1-1. Overview]

Figure 1:
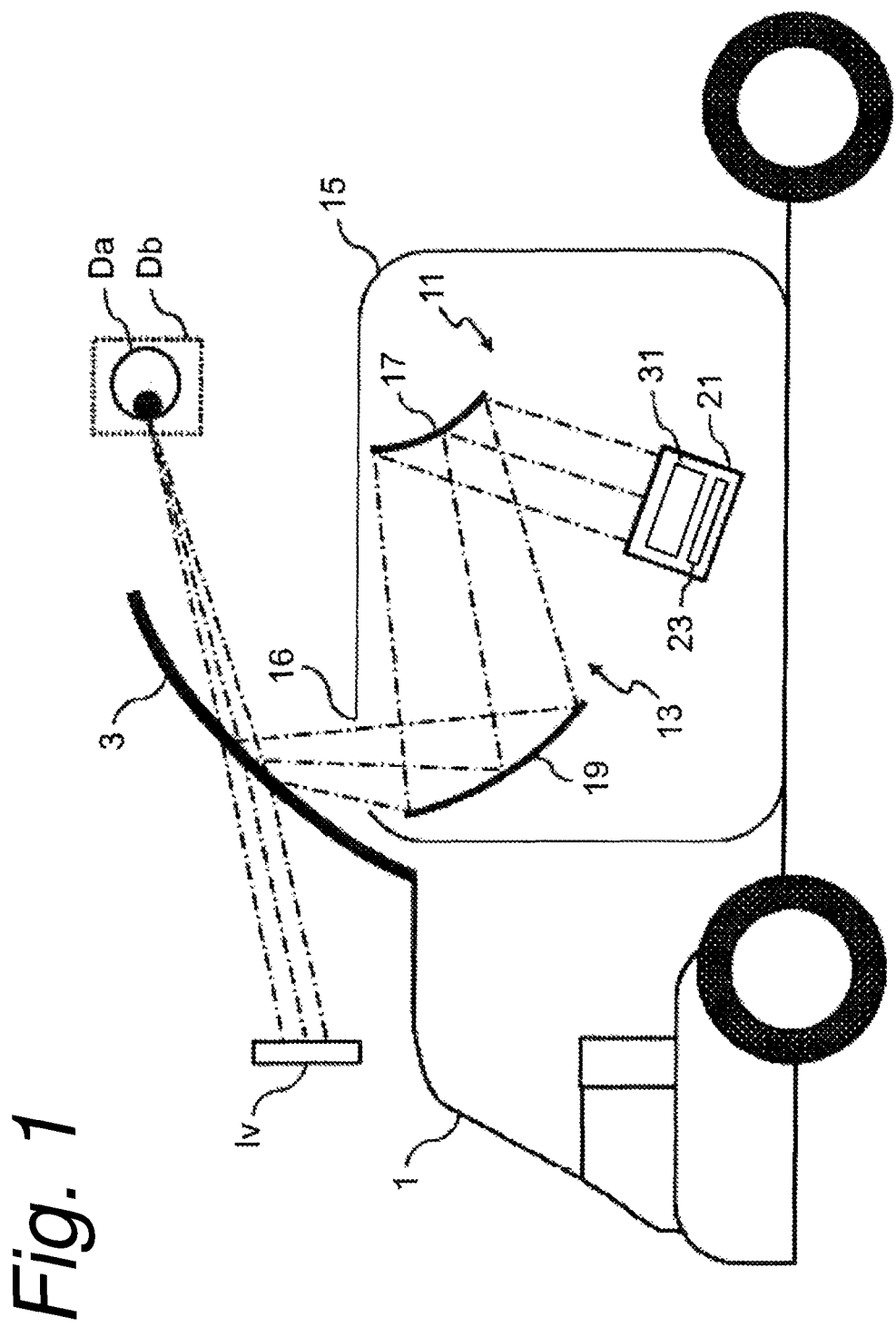
FIG. 1 is a schematic view of a vehicle equipped with a head-up display according to the first embodiment.

FIG. 1 is a schematic view of a vehicle 1 equipped with a head-up display 11 according to the present embodiment. The vehicle 1 is, for example, an automobile. For example, a driver rides on the vehicle 1 as an observer Da. The vehicle 1 includes a windshield 3 as a transparent member.

Light emitted from a display panel 31 of the head-up display 11 is guided into an eyebox Db of the observer Da through the windshield 3. As a result, the observer Da visually recognizes a virtual image Iv. The eyebox Db is an area where the observer Da can visually recognize the virtual image without lacking it.

[1-2. Configuration]

[1-2-1. Configuration of Head-Up Display]

The head-up display 11 includes an image display device 21 and a reflection optical unit 13. The head-up display 11 is arranged in a housing 15. In FIG. 1, the head-up display 11 and the housing 15 are shown in an enlarged manner for ease of understanding. The configuration of the image display device 21 will be described later.

The reflection optical unit 13 includes a first mirror 17 and a second mirror 19. The first mirror 17 reflects light emitted from the display panel 31 of the image display device 21, which will be described later, toward the second mirror 19. The second mirror 19 reflects the light from the first mirror 17 toward the windshield 3. The shape of the reflecting surface of the second mirror 19 is a concave surface shape. The reflection optical unit 13 does not necessarily have to be composed of two mirrors. The number of mirrors may be one or three or more. Further, the reflection optical unit 13 may include a refraction optical system such as a lens on an optical path.

The housing 15 has an opening 16. The opening 16 may be covered with a transparent cover.

[1-2-2. Configuration of Image Display Device]

Figure 2:
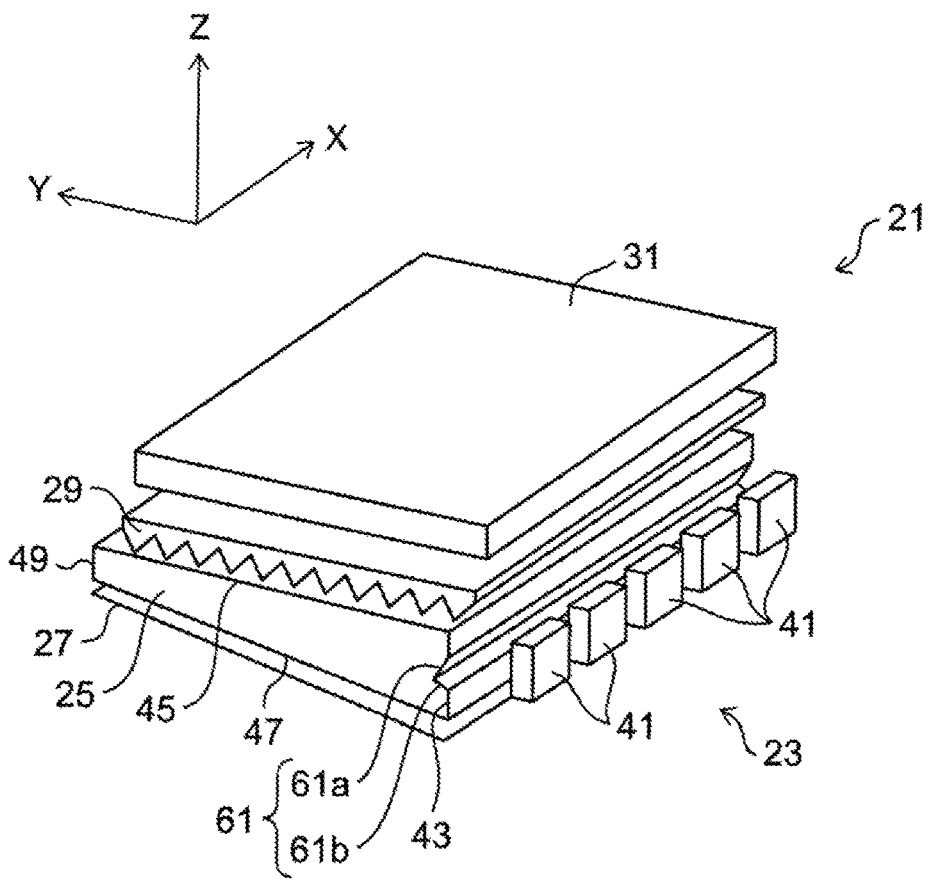
FIG. 2 is a schematic view of an image display device according to the first embodiment.
Figure 3:
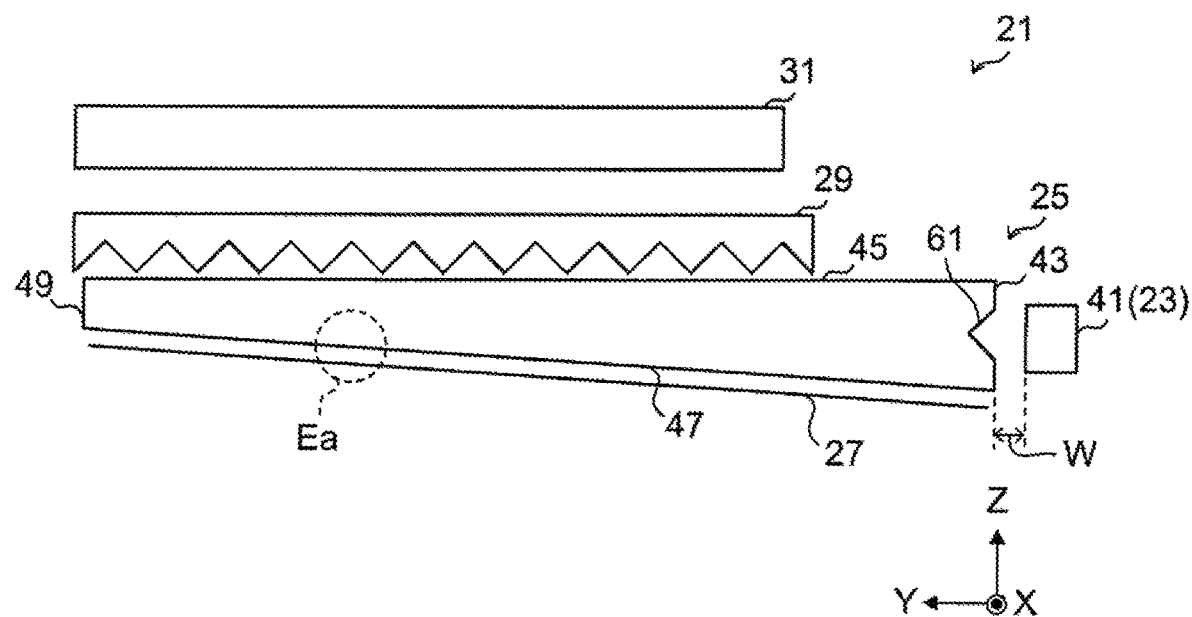
FIG. 3 is a schematic view of a cross section of the image display device according to the first embodiment.

Hereinafter, the configuration of the image display device 21 of the first embodiment will be described with reference to FIGS. 2 and 3. FIG. 2 is a schematic view of the image display device 21 according to the first embodiment. FIG. 3 is a schematic view of a cross section of the image display device 21 according to the first embodiment. This cross section is a yz cross section.

The image display device 21 includes a light source unit 23 that irradiates light, a light guide panel 25, a specular reflector 27 as a reflection member, a light beam control member 29, and the display panel 31 that displays image.

The light source unit 23 includes a plurality of light sources 41. The plurality of light sources 41 are arranged in a row in a first direction (x-axis direction) with respect to the image display device 21. The light sources 41 are light emitters that supply illumination light to the transmissive display panel 31. The light sources 41 are, for example, chip-type light emitting diodes (LED).

The light guide panel 25 guides light emitted from the light source unit 23 to the display panel 31. The light guide panel 25 is arranged so as to face the plurality of light sources 41 in a second direction (y-axis direction). The light guide panel 25 is made of resin, for example, and is arranged close to the light sources 41 at an interval of a distance W so as not to be deformed by heat of the plurality of light sources 41. The light guide panel 25 is composed of a plurality of transparent plates that guide light. The light guide panel 25 has an incident surface 43, an output surface 45, a bottom surface 47, and a facing surface 49. The incident surface 43 and the facing surface 49 face each other, and the output surface 45 and the bottom surface 47 face each other. Further, the incident surface 43 and the facing surface 49 are side surfaces of the display panel 31, and intersect the output surface 45 and the bottom surface 47. Further, in the present embodiment, the first direction is also a direction perpendicular to the light guide direction and the emission direction of the light in the incident surface 43.

The incident surface 43 faces the light source unit 23, and light emitted from the plurality of light sources 41 is incident on the incident surface 43. The incident surface 43 has a rectangular shape. The longitudinal direction of the incident surface 43 is the first direction (x-axis direction). The incident surface 43 is one end surface of the light guide panel 25 in the second direction (−y axis direction) perpendicular to a third direction (z-axis direction) in which the display panel 31 and the light guide panel 25 are stacked. The incident surface 43 has an optical path refracting portion 61 at the central portion in the longitudinal view. The optical path refracting portion 61 is a concave-shaped portion extending in the longitudinal direction.

The facing surface 49 faces the incident surface 43. The output surface 45 is arranged in a direction intersecting the incident surface 43 and the facing surface 49. Light incident from the incident surface 43 is emitted from the output surface 45. The output surface 45 is a surface defined by the first direction and the second direction orthogonal to the first direction. The output surface 45 faces the display panel 31.

The output surface 45 may have a lenticular lens shape portion. The lenticular lens shape portion is composed of a plurality of cylindrical shape portions. The mother axis of each cylindrical shape portion may be parallel to the first direction. These cylindrical shape portions may be arranged in the second direction. With these cylindrical shape portions, it is possible to reduce the stripe-like luminance unevenness parallel to the first direction and lined up in the second direction.

Figure 4:
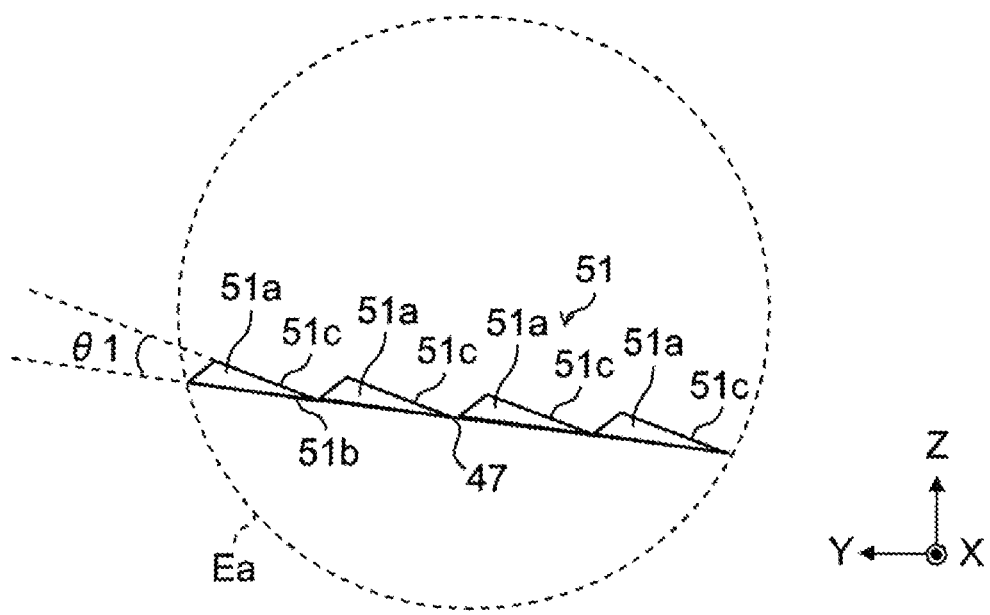
FIG. 4 is a partially enlarged view of a cross section of a bottom surface of a light guide panel according to the first embodiment.

The bottom surface 47 faces the output surface 45. The bottom surface 47 is inclined with respect to the output surface 45. The interval between the bottom surface 47 and the output surface 45 is narrower as the distance from the incident surface 43 increases. Since the interval between the bottom surface 47 and the output surface 45 in the third direction (z-axis direction) gradually narrows, the cross section (yz cross section) of the light guide panel 25 which is defined in the second direction and the third direction is a wedge shape. As shown in FIG. 4, the bottom surface 47 is formed with a prism surface 51. FIG. 4 is a partially enlarged view of a cross section of the bottom surface 47 of the light guide panel 25. An enlarged view of a part Ea of the bottom surface 47 shown in FIG. 3 is shown in FIG. 4.

The prism surface 51 has a plurality of prisms 51a. The prism 51a has, for example, a wedge shape. The prism 51a has an inclined surface 51c inclined from a surface 51b of the prism surface 51 toward the output surface 45. An angle θ1 between the inclined surface 51c and the surface 51b is 5° or less, for example. The prisms 51a increase the angle of reflection of a light beam reflected by the bottom surface 47. As a result, the light beam reflected by the bottom surface 47 is likely to deviate from the total reflection condition on the output surface 45, and the amount of light emitted from the output surface 45 can be increased.

The specular reflector 27 is arranged along the light guide panel 25 at least on the side opposite to the output surface 45, that is, on the bottom surface 47 side. When the light incident on the light guide panel 25 from the incident surface 43 is about to be emitted from the bottom surface 47, the specular reflector 27 reflects the light again inward of the light guide panel 25. The material of the specular reflector 27 has high a reflectance, for example. The material of the specular reflector 27 is, for example, metal. The specular reflector 27 is formed by depositing a metal film on the light guide panel 25 or attaching the metal film.

The light beam control member 29 is arranged on the emission side of the light guide panel 25. That is, the light beam control member 29 is arranged between the light guide panel 25 and the display panel 31. The light beam control member 29 has a row of triangular prisms on a surface facing the output surface 45 of the light guide panel 25. The shape of these triangular prisms is a triangular prism shape having an axis parallel to the first direction as a mother axis. These triangular prisms are arranged in the second direction. The apex angle of the triangular prism is preferably about 60 degrees.

The light beam emitted from the light guide panel 25 to the light beam control member 29 rises in the third direction. Since the light beam is emitted from the output surface 45 of the light guide panel 25 at an angle in which the total reflection condition is broken, the angle of the emitted light has an angle of 60 to 70 degrees with respect to the third direction. By setting the apex angle of the triangular prism to about 60 degrees, the luminance can be maximized when the image display device 21 is viewed from the third direction.

A row of cylindrical lenses may be provided on the surface of the light beam control member 29 on the side opposite to the surface on which the triangular prisms are formed, that is, the surface on the emission side. These cylindrical lenses have a semi-cylindrical shape with an axis parallel to the first direction as a mother axis. These cylindrical lenses are arranged in the second direction. The cylindrical lens deflect the light risen in the third direction by the triangular prisms to improve the front luminance. The pitches of the row of triangular prisms and the row of cylindrical lenses are equal. It is preferable that the triangular prisms and the cylindrical lenses are arranged so as to face each other so that the positions in the third direction are aligned. By arranging the triangular prisms and the cylindrical lens in this way, the uniformity of the luminance distribution is improved as a whole when the display of the image display device 21 is observed from the third direction.

Further, the pitches of the row of triangular prisms and the row of cylindrical lenses may be equal, and the positions of the triangular prisms and the cylindrical lenses in the second direction may be shifted. With such a form, the luminance can be maximized in the case of observation from a direction at an angle with respect to the third direction. For example, the pitch between the row of triangular prisms and the row of cylindrical lenses be so small that they cannot be visually recognized. Specifically, it may be set the pitch to about 1 mm or less.

The transmissive display panel 31 is arranged on the emission side of the light beam control member 29. The transmissive display panel 31 is, for example, a dot matrix display type thin film transistor (TFT) transmissive liquid crystal panel.

The material of the light guide panel 25 and the light beam control member 29 is a transparent material having a predetermined refractive index. The refractive index of the transparent material is, for example, about 1.4 to 1.6. Examples of such a transparent material include resins such as epoxy resin, silicone resin, acrylic resin, and polycarbonate. In the present embodiment, for example, polycarbonate is used in consideration of heat resistance.

Further, in the present embodiment, the image display device 21 is used for the head-up display 11 in which the range of the eyebox Db is relatively limited. In other words, the light emitted by the image display device 21 has a relatively high directivity. Therefore, as the material of the light guide panel 25, a material that does not substantially contain a scattering material is used. As a result, inside the light guide panel 25, a light beam having directivity is guided while repeating reflection.

[1-2-3. Configuration of Incident Surface of Light Guide Panel]

Figure 5:
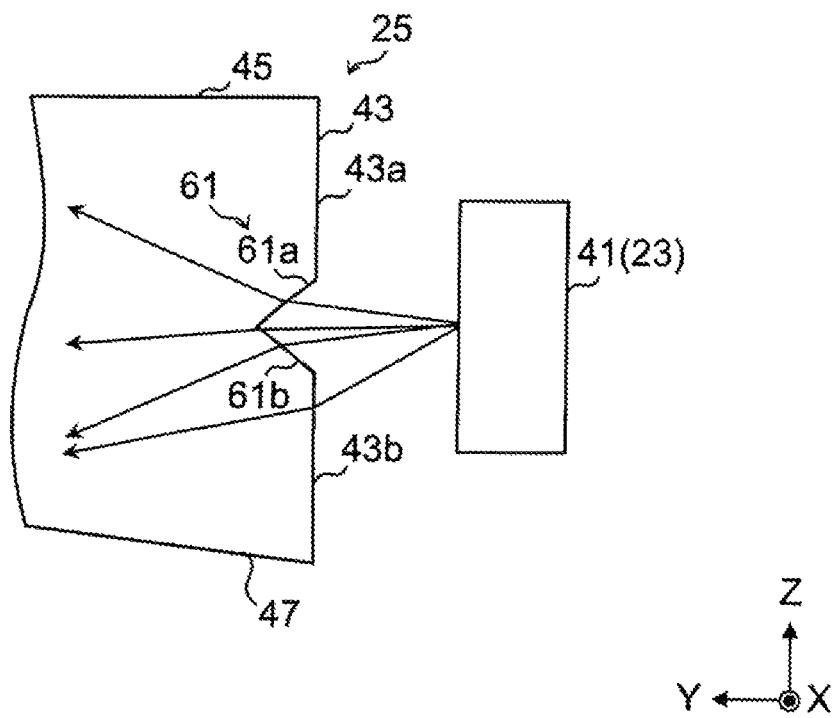
FIG. 5 is a schematic view of a partial cross section of the light guide panel according to the first embodiment.

Hereinafter, the configuration of the incident surface 43 of the light guide panel 25 of the first embodiment will be described in detail with reference to FIG. 5. FIG. 5 is a schematic view of a cross section of the light guide panel 25 according to the first embodiment. This cross section is a plane defined by the second direction and the third direction, that is, a yz cross section.

The incident surface 43 of the light guide panel 25 includes a first incident surface 43a facing the light sources 41 and connected to the output surface 45, a second incident surface 43b facing the light sources 41 and connected to the bottom surface 47, and the optical path refracting portion 61 formed between the first incident surface 43a and the second incident surface 43b. For example, the optical path refracting portion 61 is a concave portion, and is arranged so as to intersect a perpendicular line from the center of the light source unit 23 in the Z direction when viewed from a direction perpendicular to the light guide direction and the emission direction of light.

The optical path refracting portion 61 has a first inclined surface 61a connected to the first incident surface 43a, and a second inclined surface 61b connected to the first inclined surface 61a and the second incident surface 43b. The first inclined surface 61a extends from the light source 41 side of the first incident surface 43a to the facing surface 49 side, and the second inclined surface 61b extends from the facing surface 49 side of the first inclined surface 61a to the light source 41 side. The first inclined surface 61a and the second inclined surface 61b are, for example, the hypotenuses of an isosceles triangle. In the incident surface 43 of the light guide panel 25, the inclined surfaces 61a and 61b which are a part of the incident surface 43 are inclined with respect to the first incident surface 43a and the second incident surface 43b which are the remaining portions in the longitudinal view of the incident surface 43.

Figure 6:
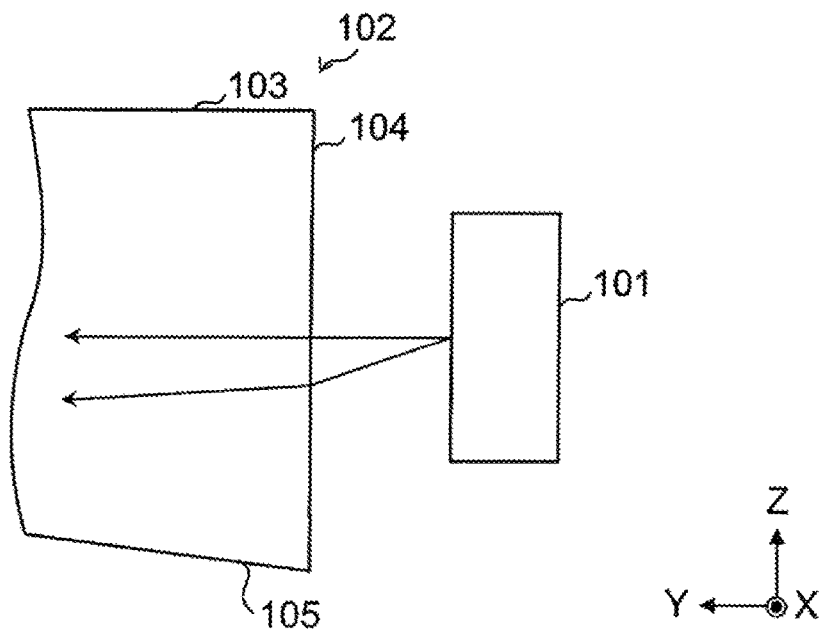
FIG. 6 is a schematic view of a partial cross section of a light guide panel in a comparative example.

An optical path incident on an incident surface will be described with reference to FIGS. 5 and 6. FIG. 6 is a schematic cross-sectional view of a conventional light guide panel 102. The optical path refracting portion 61 increases the refraction angle of the light beam incident on the incident surface 43 from the light source 41 at an angle orthogonal to the incident surface 43 or close to it. As a result, the light beam incident from the light source 41 to the incident surface 43 is suppressed from going straight to be emitted from the facing surface 49, the traveling direction is bent toward the bottom surface 47 so that the light beam is likely to be reflected by the bottom surface 47. As a result, the amount of light emitted from the output surface 45 can be increased.

As shown in FIG. 6, when the incident surface 104 of the light guide panel 102 does not include the optical path refracting portion 61, the light beam incident on the incident surface 104 from the light source 101 at an angle orthogonal to the incident surface 104 or close to it is refracted so as to be quasi-parallel to the second direction on the incident surface 104, and has strong straightness and is emitted from the facing surface 49 facing the incident surface 104 as it is. As a result, the amount of light emitted from the output surface 103 is reduced.

Figure 7:
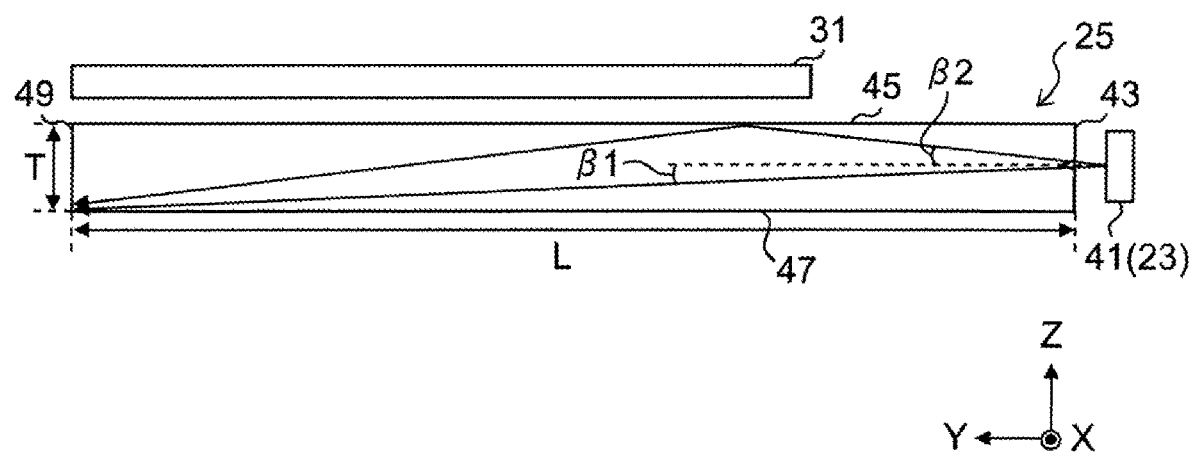
FIG. 7 is an explanatory view of a simplified model of a light guide panel.
Figure 8:
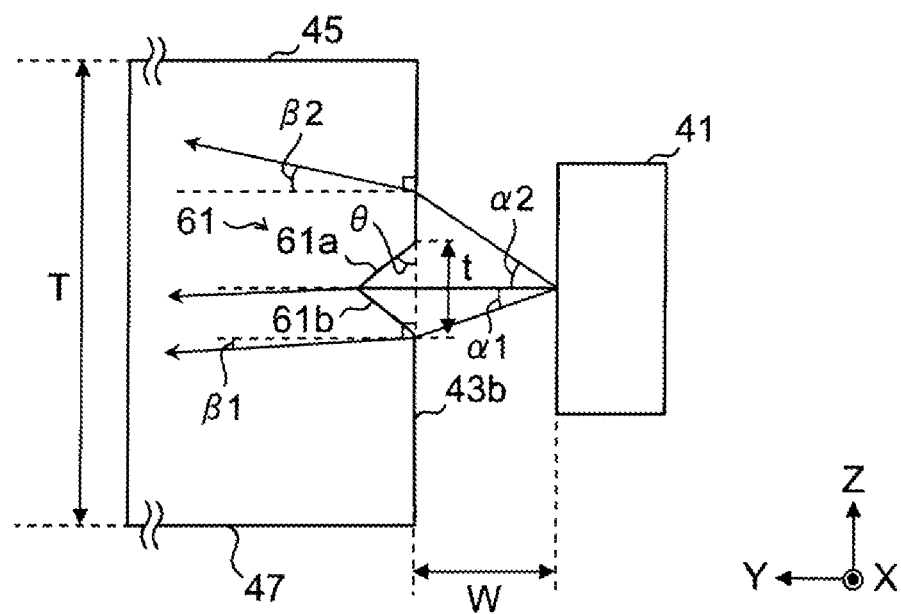
FIG. 8 is a schematic view of a partial cross section of the light guide panel.

Next, with reference to FIGS. 7 and 8, light that is never reflected by the bottom surface 47 will be described. FIG. 7 is an explanatory view of a simplified model of the light guide panel 25. FIG. 8 is a schematic view of a partial cross section of the light guide panel. The cross-sectional shape of the light guide panel 25 is a wedge shape, but in the simplified model, it is a rectangular shape. As the light that is never reflected by the bottom surface 47, for example, light that is directly incident on the facing surface 49 and light that is totally reflected by the output surface 45 and is incident on the facing surface 49 can be considered.

An angle $\beta_1$ of the light beam directly incident on the facing surface 49 from the incident surface 43 of the light guide panel 25 is an angle between the light beam and the line perpendicular to the first incident surface 43a and the second incident surface 43b. The light beam that is never reflected by the bottom surface 47 is emitted from the facing surface 49, except when it is directly emitted from the output surface 45. Therefore, the light beam emitted from the central portion of the light source 41, refracted toward the bottom surface 47 on the incident surface 43, and never reflected by the bottom surface 47 is not extracted from at least the output surface 45.

The relationship between a length L from the incident surface 43 to the facing surface 49 of the light guide panel 25, a thickness T of the light guide panel 25, and a distance W between the light sources 41 and the light guide panel 25 will be described. It is assumed that a light beam incident on the bottom surface 47 side from the incident surface 43 at the incident angle $\beta_1$ reaches the lower end of the facing surface 49 having the same thickness T as the incident surface 43. Since the distance W is sufficiently smaller than the thickness T, the following equation (1) holds.

$$\beta_1 = \arctan(T/2L) \qquad \text{Eq. (1)}$$

A light beam guided from the incident surface 43 into the light guide panel 25 at an angle smaller than the angle $\beta_1$ is not extracted from at least the output surface 45. When the incident surface 43 has a refractive index n, an emission angle $\alpha_1$ from the light source 41 is given by the following equation (2) according to Snell's law.

$$\alpha_1 = \arcsin(n \sin(\beta_1)) \qquad \text{Eq. (2)}$$

Since the optical path refracting portion 61 is formed in a part of the incident surface 43 of the light guide panel 25 in the thickness direction, the light emitted from the light source 41 having an emission angle smaller than the emission angle $\alpha_1$ is reflected by the bottom surface 47.

Figure 9:
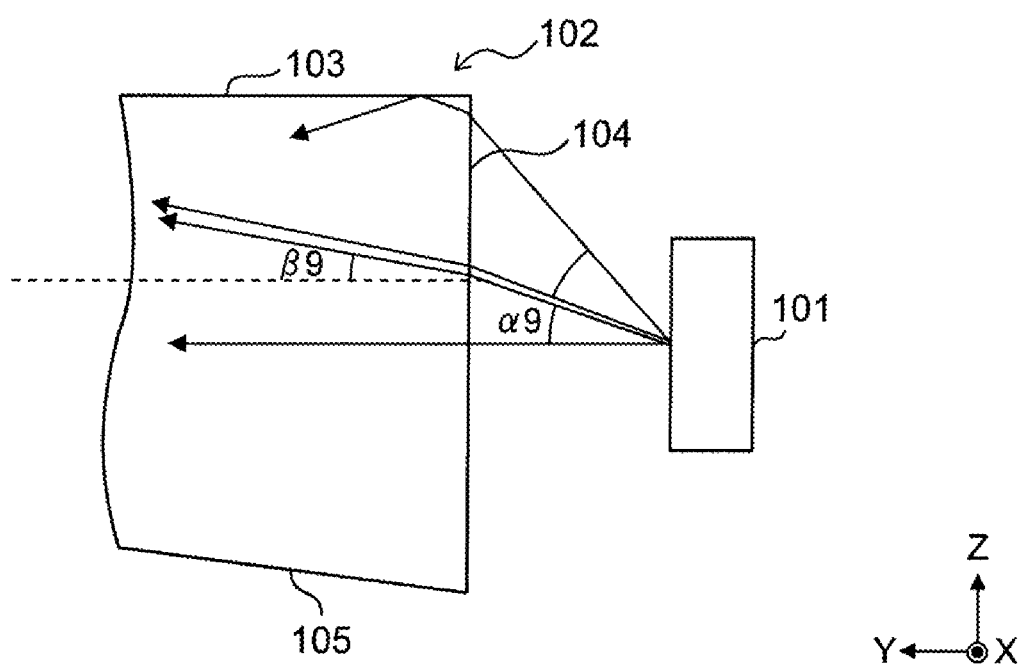
FIG. 9 is a schematic view showing a part of an optical path of the conventional light guide panel.

A length t of the optical path refracting portion 61 in the thickness direction which is capable of causing all the light beams emitted from the center of the light source 41 and having an emission angle of $\alpha_1$ or less to be incident on the optical path refracting portion 61 is given by the following equation (3). The length t is a predetermined length facing the vicinity of the center of the light emitting surface of the light source 41 and is a length that allows the light incident on the incident surface 43 of the light guide panel 25 to be reflected by the bottom surface 47 of the light guide panel 25. Further, the length t is larger than a width in which the light incident on the light guide panel 25 and not reflected by the bottom surface 47 of the light guide panel 25 is incident on the incident surface 43 of the light guide panel 25 when the incident surface 43 of the light guide panel 25 has no inclined surface, for example, in the case of a flat plate shape as shown in FIG. 9. By satisfying the equations (1) to (3), the amount of light reflected by the bottom surface 47 can be increased.

$$t \geq 2W \tan(\alpha_1) \qquad \text{Eq. (3)}$$

When a light beam going straight from the light source 41 is incident on the incident surface 43 of the light guide panel 25 and becomes larger than the angle $\beta_1$, the light beam going straight is reflected once or more by the bottom surface 47. An angle $\theta$ of the first inclined surface 61a with respect to the surfaces of the first incident surface 43a and the second incident surface 43b satisfying this is given by the following equation (4). The angle $\theta$ can be said to be an angle between the first incident surface 43a and the second incident surface 43b which are the remaining portions of the concave portion on the incident surface 43, and the first inclined surface 61a forming the concave portion.

$$\theta \geq \arctan[1 + \sin(\beta_1)/\{n \cos(\beta_1)\}] \qquad \text{Eq. (4)}$$

When the equations (3) and (4) are satisfied at the same time, all the light beams emitted from the central portion of the light source 41 toward the bottom surface 47 side (−Z direction) are reflected once or more by the bottom surface 47. For an angle $\beta_2$ of the light beam emitted to the output surface 45 side (+Z direction), totally reflected by the output surface 45, never reflected by the bottom surface 47, and incident on the facing surface 49, the following equation (5) is established. The length t of the optical path refracting portion 61 in the thickness direction which causes all the light beams emitted from the center of the light source 41 and having an emission angle smaller than $\alpha_2$ to be incident on the optical path refracting portion 61 is given by the following equation (6). Further, the emission angle $\alpha_2$ from the light source 41 is given by the following equation (7) according to Snell's law.

$$\beta_2 = \arctan(3T/2L) \qquad \text{Eq. (5)}$$

$$t \geq 2W \tan(\alpha_2) \qquad \text{Eq. (6)}$$

$$\alpha_2 = \arcsin(n \sin(\beta_2)) \qquad \text{Eq. (7)}$$

By satisfying the equations (5) to (7), the amount of light reflected by the bottom surface 47 can be increased even for light directed in the +Z direction. When the cross-sectional shape of the light guide panel 25 is a wedge shape, the equation (5) is established with the thickness of the light guide panel 25 as the thickness T of the light guide panel on the facing surface 49.

Figure 10:
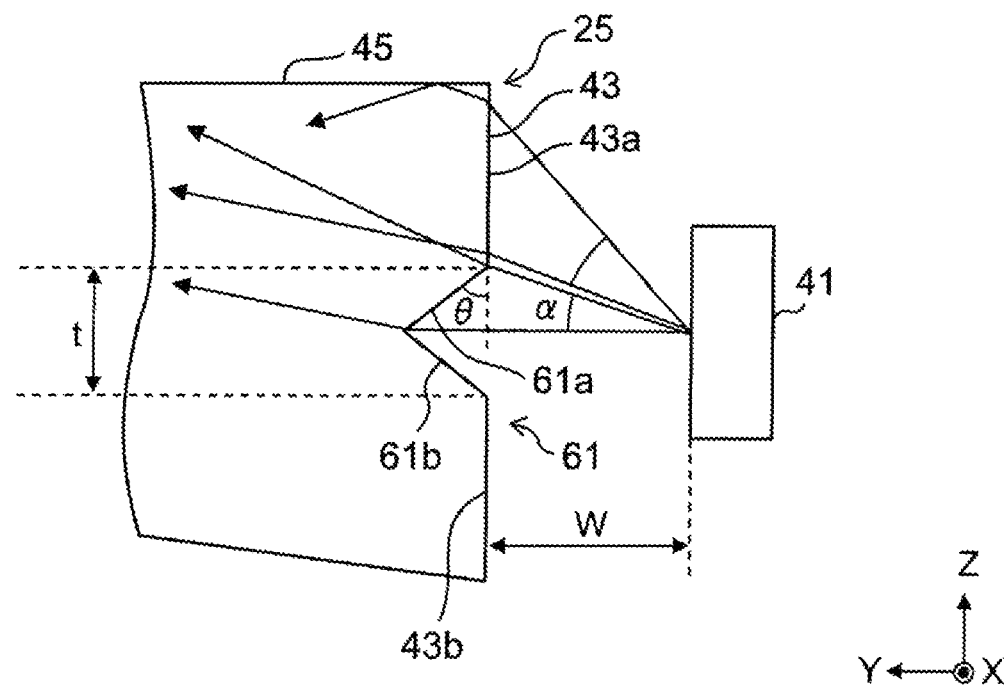
FIG. 10 is a schematic view showing a part of an optical path of the light guide panel.
Figure 11:
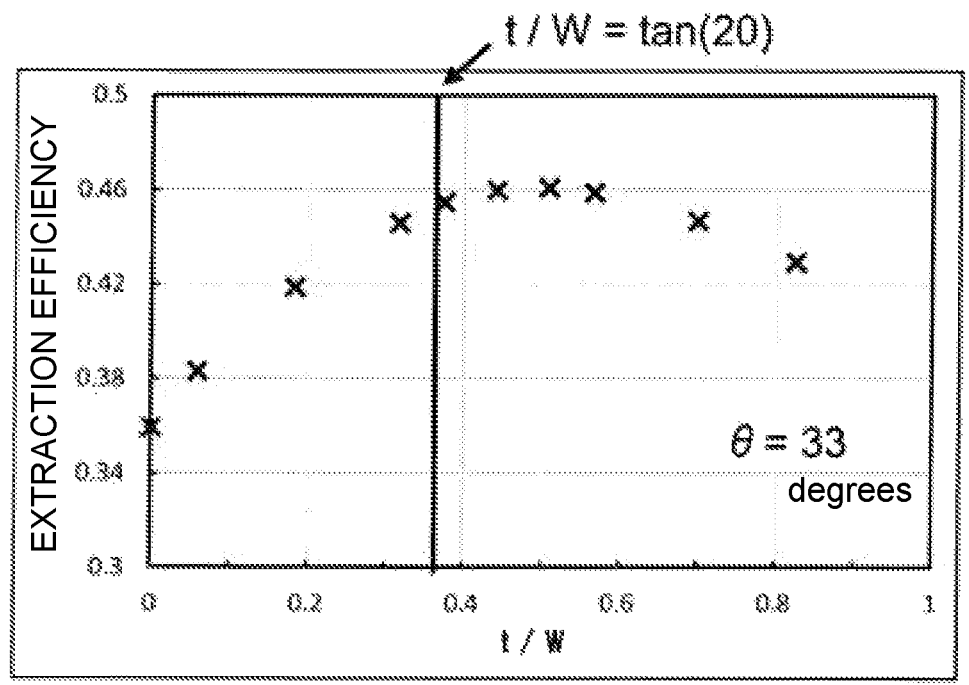
FIG. 11 is a graph showing the relationship between the extraction efficiency of the amount of light emitted from an output surface and t/W.
Figure 12:
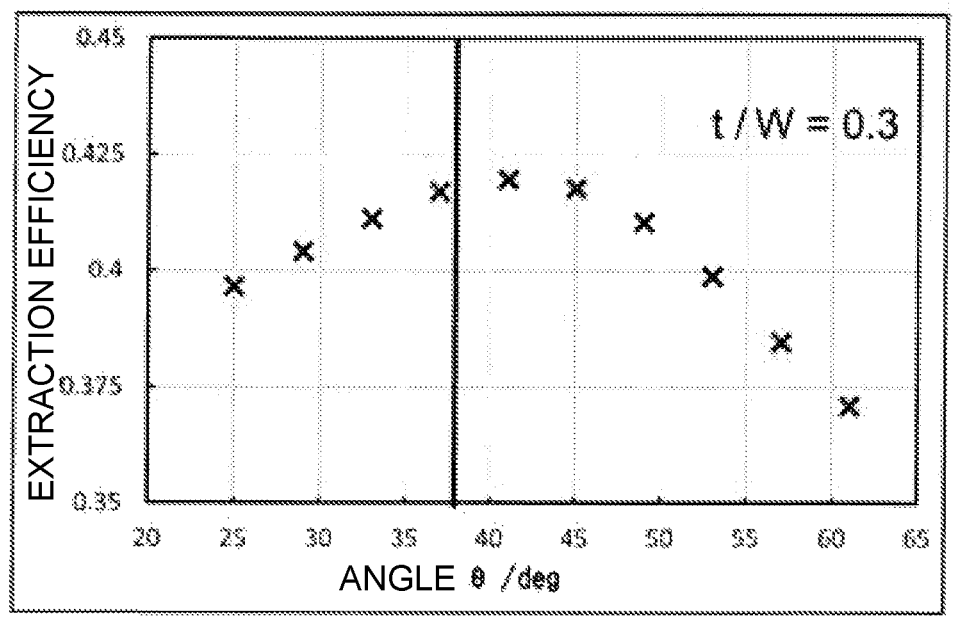
FIG. 12 is a graph showing the relationship between the extraction efficiency of the amount of light emitted from the output surface and an angle θ.

Next, with reference to FIGS. 9 to 12, t/W and θ calculated by modeling are optimized with the actual shape of the light guide panel 25 of the present embodiment. FIG. 9 is a schematic view showing a part of an optical path of the conventional light guide panel 102. FIG. 10 is a schematic view showing a part of an optical path of the light guide panel 25. FIG. 11 is a graph showing the relationship between the extraction efficiency of the amount of light emitted from the output surface 45 and t/W. FIG. 12 is a graph showing the relationship between the extraction efficiency of the amount of light emitted from the output surface 45 and the angle θ.

For example, the thickness T is 1.34 mm as the thickness of the light guide panel 25 at the facing surface 49, and the length L from the incident surface 43 to the facing surface 49 is 75 mm. Further, for example, the distance W between the light sources 41 and the incident surface 43 is 1 mm.

As shown in FIG. 11, when t/W is increased, the extraction efficiency is reduced. Further, as shown in FIG. 12, even when θ is increased, the extraction efficiency is reduced. This is because more light beams are extracted on the light source side than the used area of the output surface 45, which is a projection area for the display panel 31, so that the extraction efficiency is reduced. In order to increase the extraction efficiency and reduce the uneven luminance, t and θ are designed with values close to the values for which the equal sign holds in Eqs. (3) and (4). As shown in FIG. 10, a light beam from the light source 41 having an emission angle α of 20° to 50° is repeatedly reflected by the output surface 45 and the bottom surface 47 in the light guide panel 25, and is eventually emitted from the output surface 45. Further, since a light beam from the light source 41 having an emission angle α of 0° to 20° is incident on the light guide panel 25 by being increased in the incident angle by the optical path refracting portion 61, so that the light beam can be prevented from going straight to the facing surface 49. According to the conventional light guide panel shown in FIG. 9, the light beam from the light source 41 having an emission angle α9 of 0° to 20° has strong straightness even if it is incident on the incident surface 43, so that the light beam goes straight to the facing surface 49 and cannot be extracted from the output surface 45.

[1-3. Effects, Etc.]

As described above, the image display device 21 of the present embodiment includes the light source unit 23 that irradiates the light, the display panel 31 that displays the image, and the light guide panel 25 that guides the light emitted from the light source unit 23 to the display panel 31. The light guide panel 25 has the incident surface 43 facing the light source unit 23 and the output surface 45 facing the display panel 31. The incident surface 43 is a side surface of the output surface 45, and includes, when viewed from the direction perpendicular to the light guide direction and the emission direction of the light in the incident surface 43, the first inclined surface 61a and the second inclined surface 61b, which are the parts of the incident surface 43 respectively, inclined with respect to the first incident surface 43a and the second incident surface 43b which are the remaining portions of the incident surface 43.

As a result, even if a light beam having a small emission angle is incident on the incident surface 43 of the light guide panel 25 from the light source unit 23, the refraction angle can be increased by passing through the first inclined surface 61a and the second inclined surface 61b. As a result, the light beam incident on the light guide panel 25 can be reflected in the light guide panel 25, and the amount of light extracted from the output surface 45 can be increased. Therefore, it is possible to provide the image display device 21 increased in the amount of light and the head-up display 11 equipped with the image display device 21.

Further, in the present embodiment, the incident surface 43 of the light guide panel 25 includes the optical path refracting portion 61 which is formed by the first inclined surface 61a and the second inclined surface 61b, and is a concave portion recessed from the first incident surface 43a and the second incident surface 43b which are the remaining portions of the incident surface 43. Even if a light beam having a small emission angle is incident on the incident surface 43 from the light source unit 23, the refraction angle can be increased by the optical path refracting portion 61 being the concave portion formed by the first inclined surface 61a and the second inclined surface 61b.

Further, in the present embodiment, the head-up display 11 includes the image display device 21. Thereby, it is possible to provide the head-up display 11 increased in the amount of light.

Further, in the present embodiment, the vehicle includes the head-up display 11. Thereby, it is possible to provide the vehicle 1 including the head-up display 11 increased in the amount of light.

Figure 13:
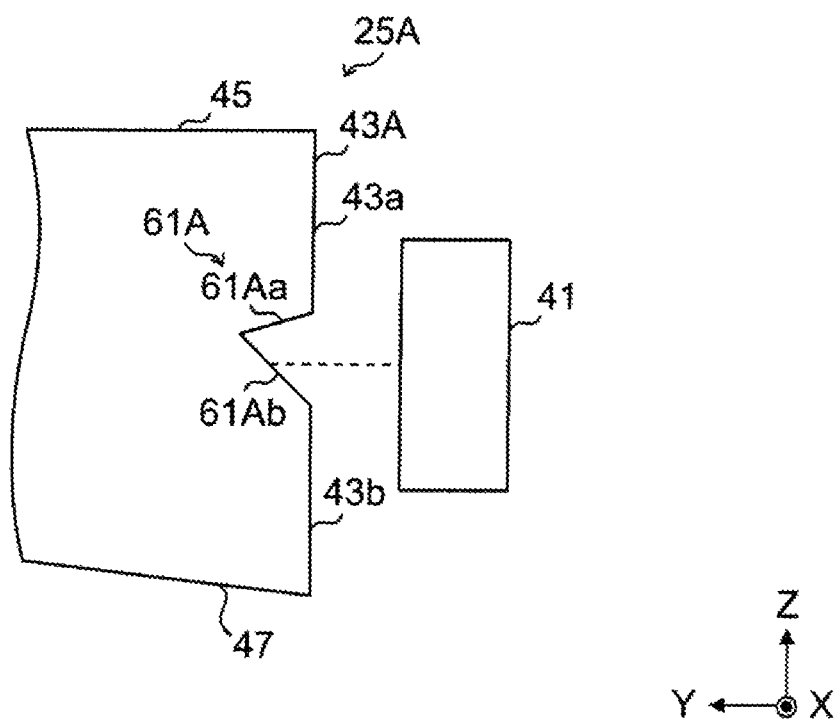
FIG. 13 is a schematic view of a partial cross section of a light guide panel in a modified example of the first embodiment.

Next, a modified example of the optical path refracting portion 61 of the present embodiment will be described. As shown in FIG. 5, the above-mentioned optical path refracting portion 61 has an isosceles triangular concave shape recessed from the first and second incident surfaces 43a and 43b to the inside of the light guide panel 25, but the present invention is not limited to this. For example, as shown in FIG. 13, in an optical path refracting portion 61A of an incident surface 43A, a first inclined surface 61Aa is shorter than a second inclined surface 61Ab. That is, the angle between the first inclined surface 61Aa and the first incident surface 43a and the angle between the second inclined surface 61Ab and the second incident surface 43b may be different. The optical axis, which is the center of the light source 41, may not pass through the most recessed portion of the concave portion of the optical path refracting portion 61, and passes through, for example, the second inclined surface 61Ab. Further, the length t of the optical path refracting portion 61 may be larger than the length of the light emitting surface of the light source 41 in the Z direction.

Figure 14:
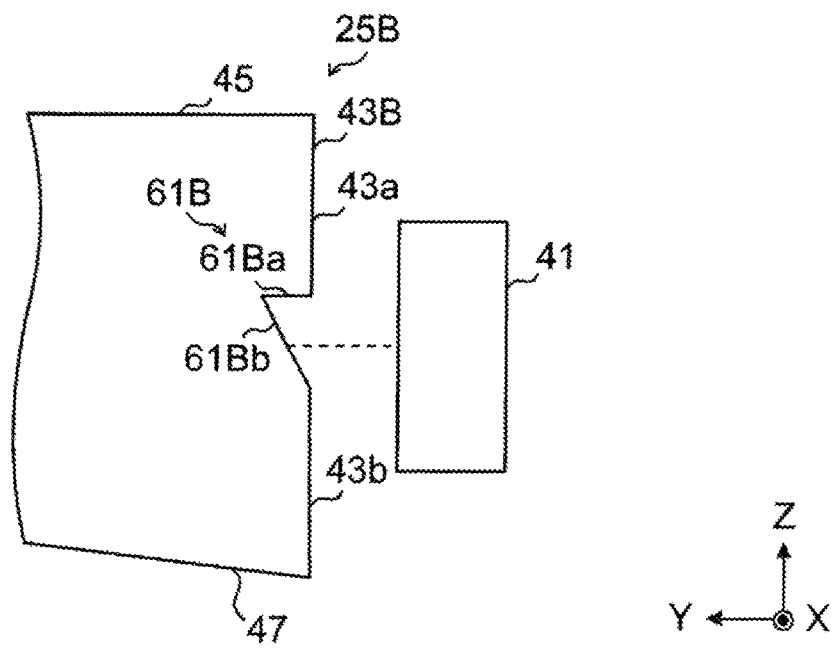
FIG. 14 is a schematic view of a partial cross section of a light guide panel in a modified example of the first embodiment.

Further, as shown in FIG. 14, an optical path refracting portion 61B of an incident surface 43B includes an orthogonal surface 61Ba orthogonal to the first incident surface 43a and extending inward of a light guide panel 25B, and an inclined surface 61Bb connecting the orthogonal surface 61Ba and the second incident surface 43b. The orthogonal surface 61Ba and the inclined surface 61Bb have a relationship between a bottom surface and an inclined surface of a right triangle. The optical axis of the light source 41 passes through, for example, the inclined surface 61Bb.

Figure 15:
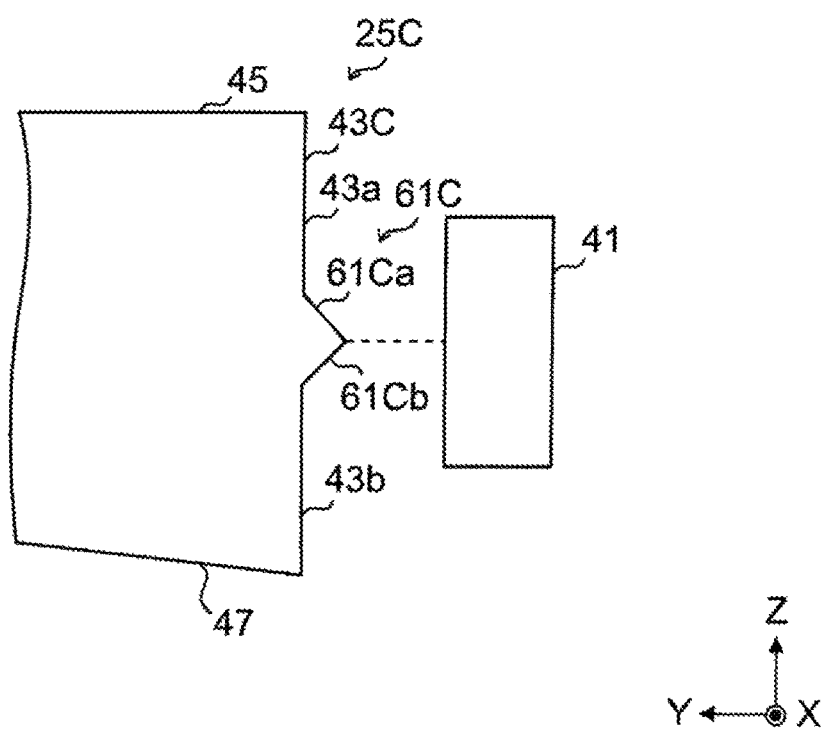
FIG. 15 is a schematic view of a partial cross section of a light guide panel in a modified example of the first embodiment.

Further, as shown in FIG. 15, an optical path refracting portion 61C included in an incident surface 43C has a convex shape protruding outward of a light guide panel 25C from the first and second incident surfaces 43a and 43b. The incident surface 43C has a first inclined surface 61Ca extending from the first incident surface 43a to the light source 41 side, and a second inclined surface 61Cb extending from the second incident surface 43b to the light source 41 side and connected to the first inclined surface 61Ca. The first inclined surface 61Ca and the second inclined surface 61Cb may have a relationship between two inclined surfaces of an isosceles triangle, may have different lengths, or may have a relationship between a base and an inclined surface of a right triangle. The optical axis of the light source may pass through the ridgeline formed by the first inclined surface 61Ca and the second inclined surface 61Cb, or may pass through either inclined surface.

As described above, in the present embodiment, the incident surface 43C of the light guide panel 25C includes the optical path refracting portion 61C which is formed by the first inclined surface 61Ca and the second inclined surface 61Cb, and is a convex portion protruding from the first incident surface 43a and the second incident surface 43b which are the remaining portions of the incident surface 43. As a result, even if a light beam having a small emission angle is incident on the incident surface 43C from the light source unit 23, the refraction angle can be increased by the optical path refracting portion 61C being the convex portion formed by the first inclined surface 61Ca and the second inclined surface 61Cb.

Figure 16:
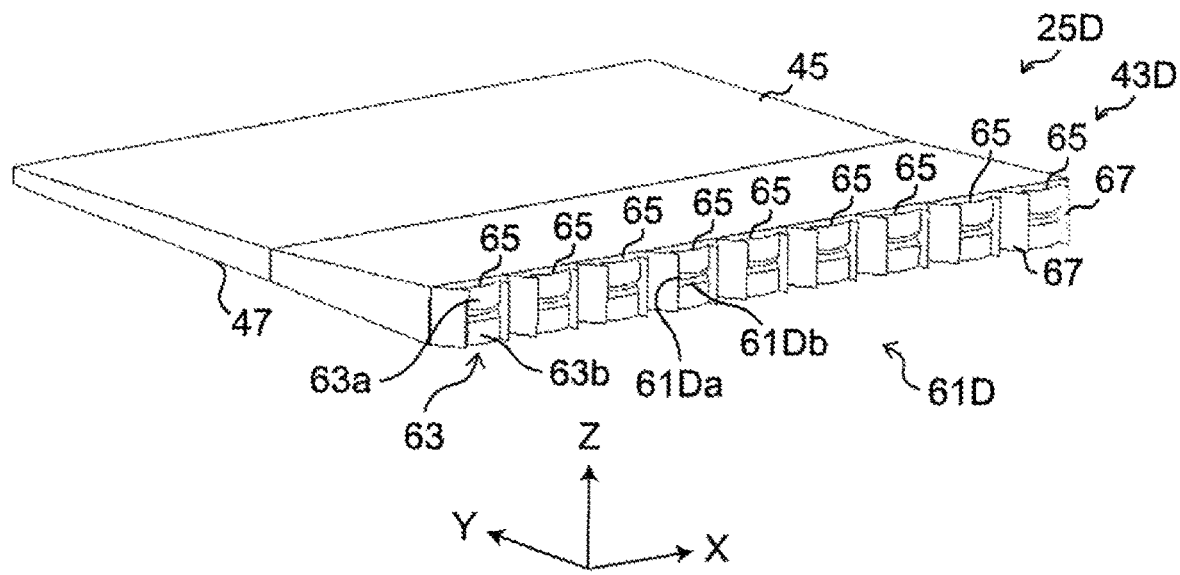
FIG. 16 is a perspective view of a light guide panel in a modified example of the first embodiment.
Figure 17:
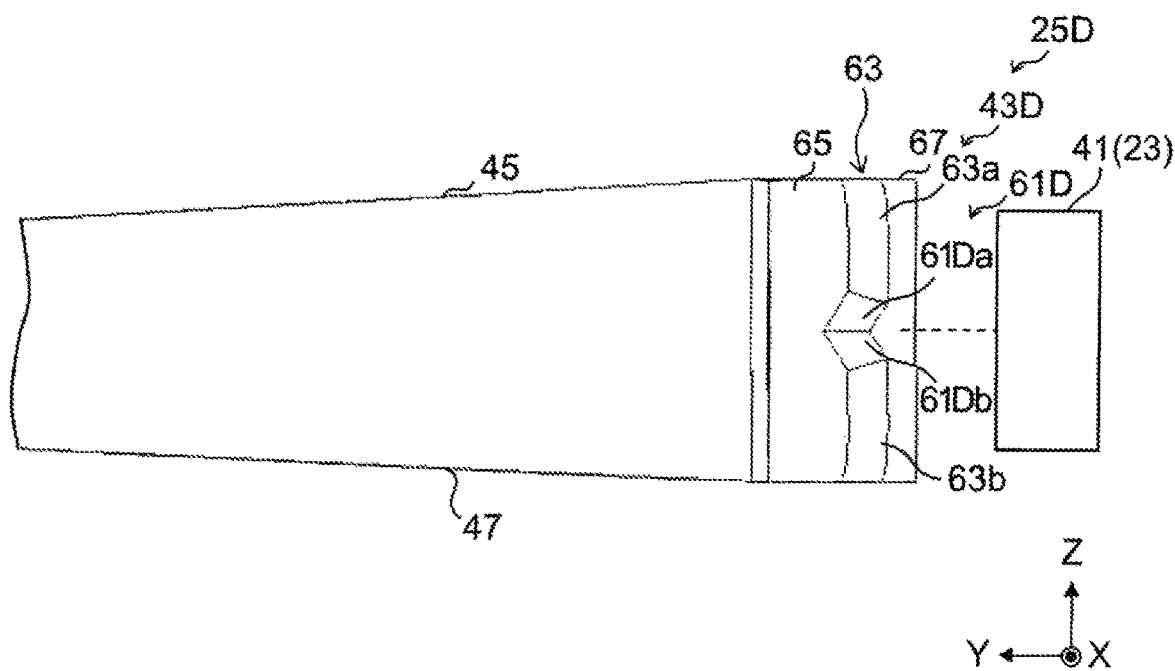
FIG. 17 is a side view of the light guide panel in the modified example of the first embodiment when viewed from a cross section.

Next, a modified example of the light guide panel 25 of the first embodiment will be described with reference to FIGS. 16 and 17. FIG. 16 is a perspective view of a light guide panel 25D in the modified example of the first embodiment, and FIG. 17 is a side view of the light guide panel 25D in the modified example of the first embodiment when viewed from a cross section.

As shown in FIG. 16, an incident surface 43D of the light guide panel 25D has a plurality of convex surfaces 63 facing the respective light source 41. Each convex surface is a curved surface that protrudes and curves in a direction facing each light source 41. The axis of the center of curvature of each convex surface 63 is perpendicular to the xy plane. That is, the axis of the center of curvature of each convex surface 63 is parallel to the third direction (z-axis direction). The portion of the light guide panel 25D having each convex surface 63 is referred to as a cylindrical shape portion 65. The shape of each cylindrical shape portion 65 is a semi-cylindrical shape with a straight line parallel to the third direction as a mother axis. The third direction is a direction orthogonal to both the first direction and the second direction. The plurality of cylindrical shape portions 65 are arranged in the first direction. Each cylindrical shape portion 65 is formed integrally with the light guide panel 25.

An optical path refracting portion 61D is formed in the central portion of the cylindrical shape portion 65 in the third direction. A first inclined surface 61Da is formed from a first convex surface 63a of the cylindrical shape portion 65 connected to the output surface 45 toward the inside of the light guide panel 25D in the second direction. Further, a second inclined surface 61Db is formed from a second convex surface 63b of the cylindrical shape portion 65 connected to the bottom surface 47 toward the inside of the light guide panel 25D in the second direction. The first inclined surface 61Da and the second inclined surface 61Db have a curved shape, but may be flat. The optical path refracting portion 61D has a concave portion extending in the longitudinal direction, which is composed of the first inclined surface 61Da and the second inclined surface 61Db. Since the concave portions are formed in the respective cylindrical shape portions 65, they are formed intermittently in the longitudinal direction of the incident surface 43D.

The incident surface 43D has protruding portions 67 extending toward the light sources 41 in contact with the outer peripheral surfaces of the respective cylindrical shape portions 65.

Figure 18:
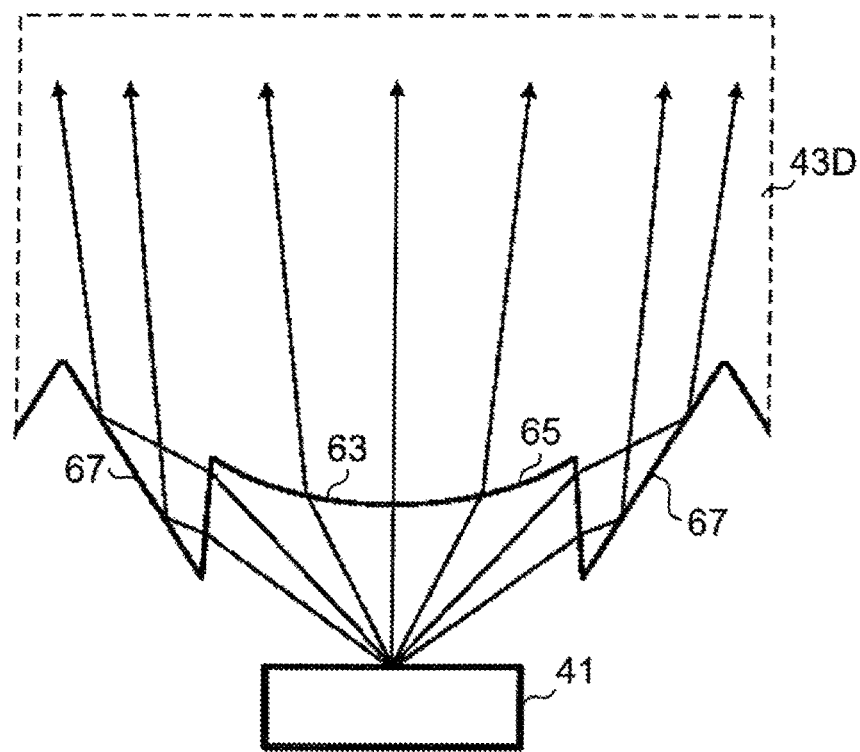
FIG. 18 is a top view showing a part of an optical path of an incident surface in the modified example of the first embodiment.
Figure 19:
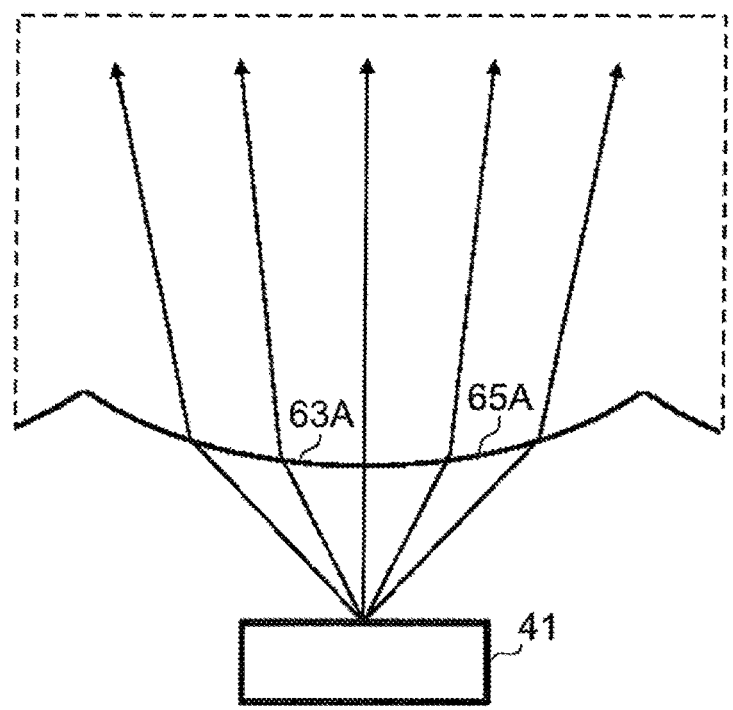
FIG. 19 is a top view showing a part of an optical path of an incident surface in a comparative example.

As shown in FIG. 18, the protruding portions 67 can collimate a light beam emitted from the light source 41. FIG. 19 shows the travel of light beams in a cylindrical shape portion having no protruding portion. The cylindrical shape portion 65 having the protruding portion 67 can focus more light beams.

As described above, in the present embodiment, the light source unit 23 includes the plurality of light sources 41, the incident surface 43D has the cylindrical shape portions 65 so as to face the respective light sources 41, and the cylindrical shape portion 65 has the first inclined surface 61Da and the second inclined surface 61Db.

Second Embodiment

Figure 20:
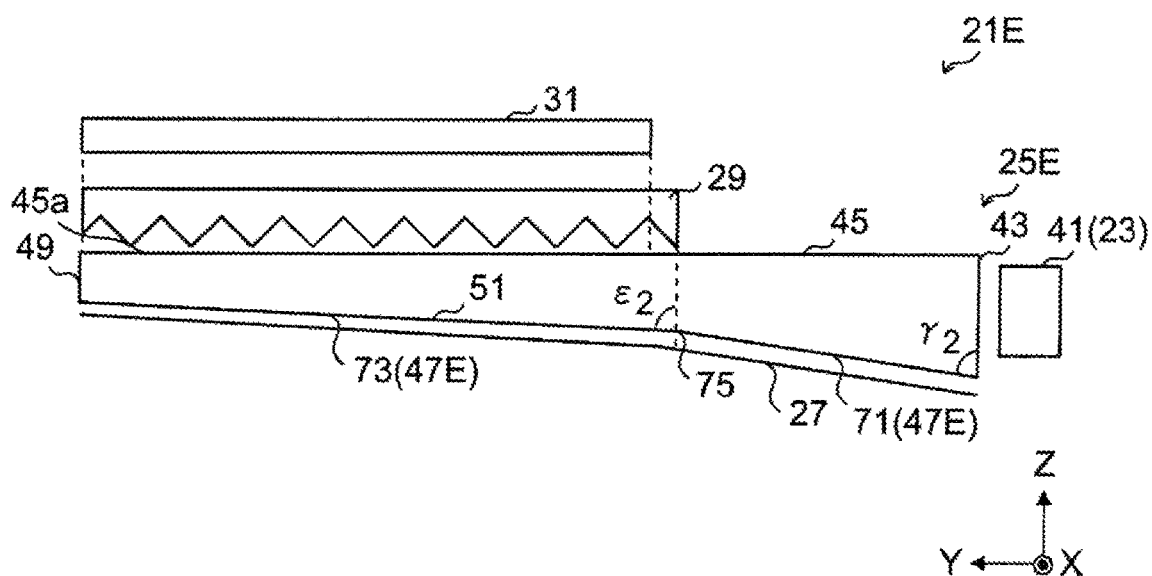
FIG. 20 is a schematic view of a cross section of an image display device according to the second embodiment.

Hereinafter, an image display device 21E of the second embodiment will be described with reference to FIG. 20. In the image display device 21E of the second embodiment, the shape of a light guide panel 25E is different from that of the light guide panel 25 of the first embodiment. In the second embodiment, members having the same configuration and function as those in the first embodiment are designated by the same reference numerals, and detailed description thereof and description of the same effects may be omitted.

[2-1. Configuration]

The image display device 21E includes the light source unit 23 that irradiates light, the light guide panel 25E, the specular reflector 27 as a reflection member, the light beam control member 29, and the display panel 31 that displays image.

The light guide panel 25E has the incident surface 43, the output surface 45, the bottom surface 47E, and the facing surface 49.

The bottom surface 47E has a first main surface 71 closer to the incident surface 43, and a second main surface 73 farther from the incident surface 43 than the first main surface 71. The first main surface 71 and the second main surface 73 are inclined with respect to the incident surface 43 and the output surface 45. A third angle γ2 between the first main surface 71 and the incident surface 43 and a fourth angle ε2 between the second main surface 73 and the incident surface 43 are defined. The relationship between the third angle γ2 and the fourth angle ε2 is γ2<ε2. In other words, the relationship between a first angle (90−γ2) between the first main surface 71 and the output surface 45 and a second angle (90−ε2) between the second main surface 73 and the output surface 45 is the first angle (90−γ2)>the second angle (90−ε2). In this way, the inclination of the bottom surface 47E is formed in two or more steps.

Since the first main surface 71 is more inclined than the second main surface 73 with respect to the output surface 45, the angle of a light beam reflected by the first main surface 71 can be increased. Further, a boundary line 75 between the first main surface 71 and the second main surface 73 is on the incident surface 43 side (light source 41 side) with respect to a projection area 45a for the display panel 31 on the output surface 45. As a result, the angle of a light beam reflected by the bottom surface 47E on the light source 41 side than on the projection area 45a can be increased, so that the amount of light extracted from the projection area 45a of the output surface 45 can be increased.

The second main surface 73 is formed with a prism surface 51, similarly to the bottom surface 47 of the first embodiment. Therefore, the second main surface 73 has a plurality of prisms 51*a*. As a result, the angle of a light beam reflected by the second main surface 73 can be increased, and a light beam reflected by the second main surface 73 is likely to deviate from the total reflection condition on the output surface 45.

Figure 21:
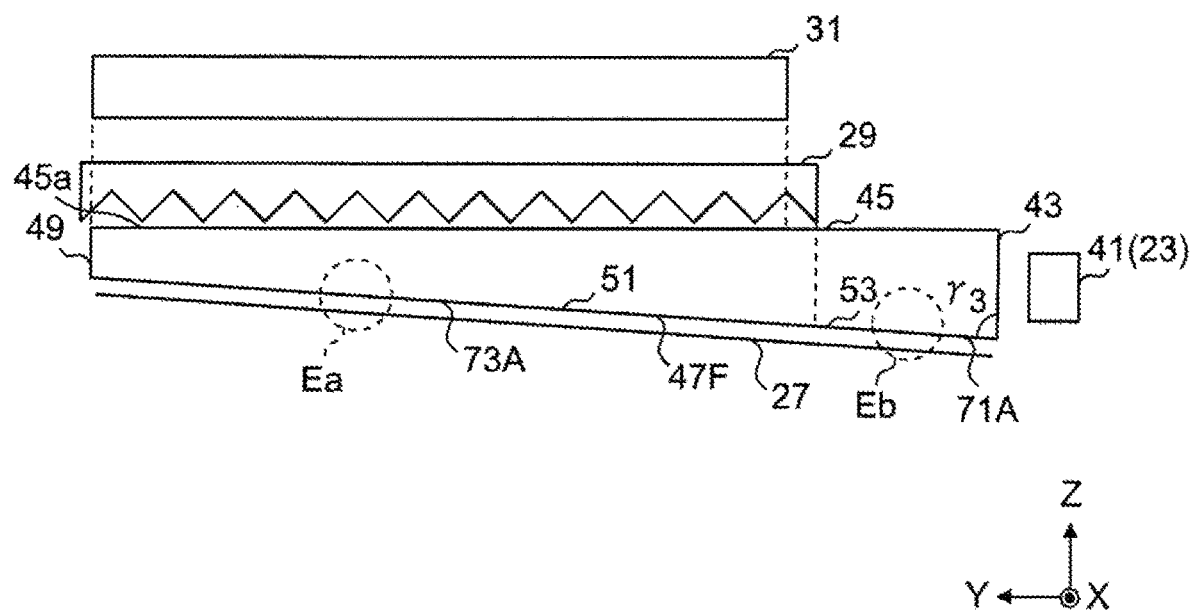
FIG. 21 is a schematic view of a cross section of an image display device in a modified example of the second embodiment.

Further, as shown in FIG. 21, a first main surface 71A and a second main surface 73A on the bottom surface 47F have the same angle γ3 with respect to the incident surface 43 on both surfaces. However, by forming a prism surface 53 having a different angle also on the first main surface 71A, the inclination of the bottom surface 47F may be set in two stages with the first main surface 71A and the second main surface 73A.

Figure 22:
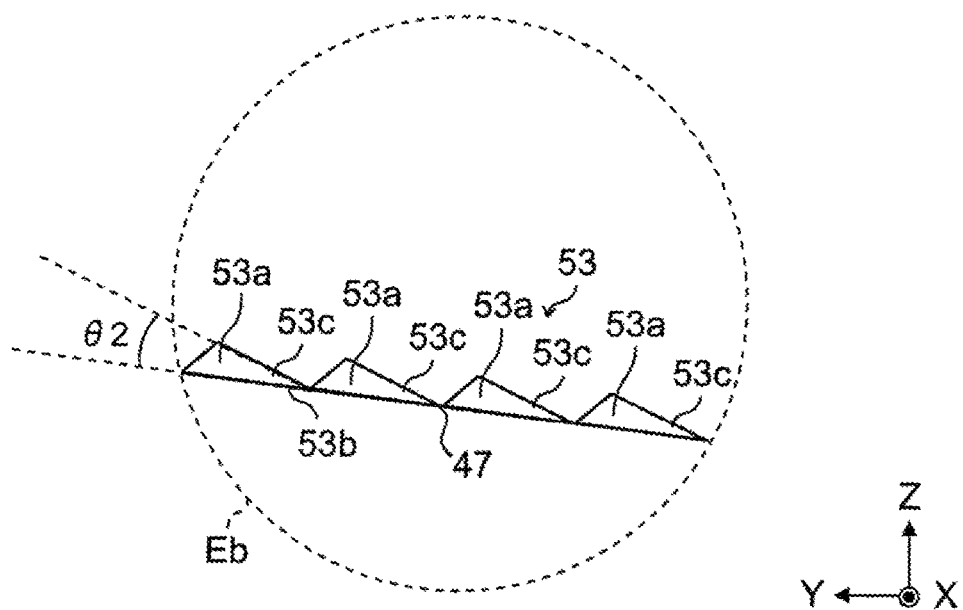
FIG. 22 is a schematic view of a partial cross section of a light guide panel.

As shown in FIG. 22, the prism surface 53 has a plurality of prisms 53*a*. The prism 53*a* has, for example, a wedge shape. The prism 53*a* has an inclined surface 53*c* inclined from a surface 53*b* of the prism surface 53 toward the output surface 45. An angle θ2 between the inclined surface 53*c* and the surface 53*b* is larger than the angle θ1 of the prism surface 51. Therefore, as a result, the angle between the first main surface 71A and the output surface 45 is larger than the angle between the second main surface 73A and the output surface 45.

Figure 23:
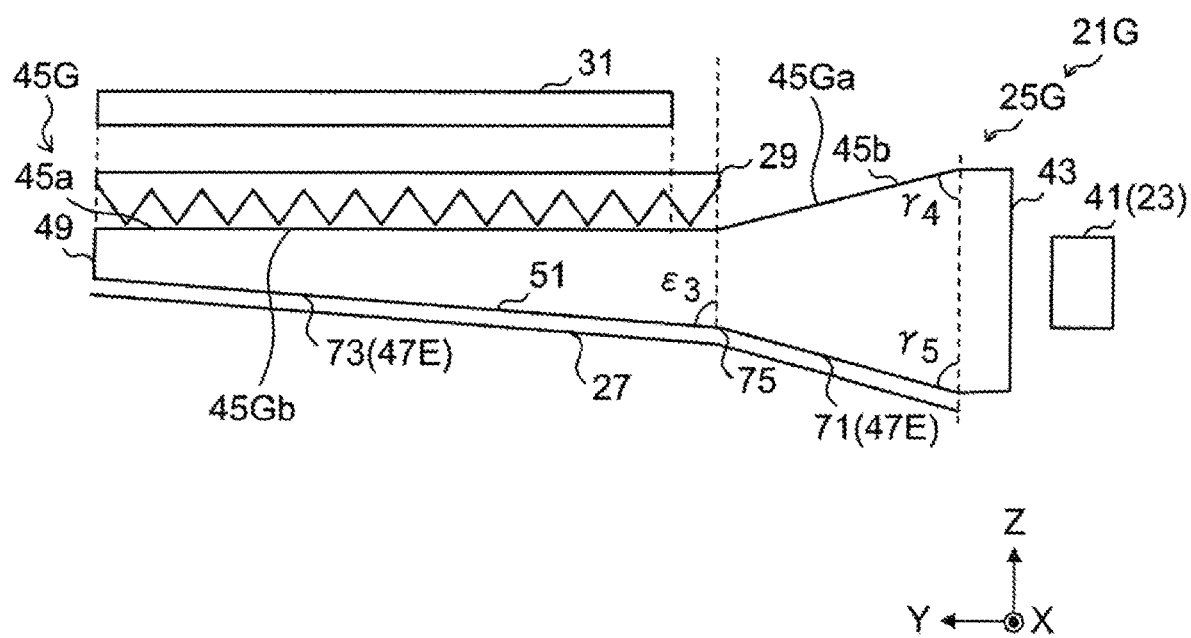
FIG. 23 is a schematic view of a cross section of an image display device in a modified example of the second embodiment.

Further, as shown in FIG. 23, the inclination of the output surface may also be set in two stages. A third main surface 45Ga, which is a part of a non-projection area 45*b* of an output surface 45G, is inclined toward the display panel 31 with respect to a fourth main surface 45Gb formed by the projection area 45*a* of the output surface 45G and a part of the non-projection area 45*b* extending from the projection area 45*a* to the third main surface 45Ga, so that the thickness of the light guide panel 25G can be increased. A fifth angle γ4 between the third main surface 45Ga and the incident surface 43 and a third angle γ5 between the first main surface 71 and the incident surface 43 are smaller than a second angle ε3 between the second main surface 73 and the incident surface 43. In other words, the output surface 45G has the third main surface 45Ga closer to the incident surface 43, and the fourth main surface 45Gb farther from the incident surface 43 than the third main surface 45Ga, and the third main surface 45Ga is inclined toward the display panel 31 side, that is, the side opposite to the light source unit 23 in the third direction with respect to the fourth main surface 45Gb. The third main surface 45Ga has an angle (90−γ4) with respect to the fourth main surface 45Gb. As a result, the amount of light that can be taken in from the light sources 41 can be increased. Further, the angle at which the light beam incident from the incident surface 43 is reflected by the third main surface 45Ga can be increased, and the total reflection condition is likely to be deviated on the projection area 45*a*. Further, by making both surfaces of the output surface 45G and the bottom surface 47E inclined in plurality, the amount of light emitted from the fourth main surface 45Gb including the projection area 45*a* of the output surface 45G can be further increased. Further, the third angle γ5 and the fifth angle γ4 may be the same.

[2-3. Effects, Etc.]

As described above, the image display device 21E of the present embodiment includes the light source unit 23 that irradiates the light, the display panel 31 that displays the image, and the light guide panel 25E that guides the light emitted from the light source unit 23 to the display panel 31. The light guide panel 25E has the incident surface 43 facing the light source unit 23, the output surface 45 facing the display panel 31, and the bottom surface 47E facing the output surface 45 on the side opposite to the display panel 31. The bottom surface 47E has the first main surface 71 closer to the incident surface 43, and the second main surface 73 farther from the incident surface 43 than the first main surface 71, the first main surface 71 and the second main surface 73 are inclined with respect to the output surface 45, and the first angle (90−γ2) between the first main surface 71 and the output surface 45 is larger than the second angle (90−ε2) between the second main surface 73 and the output surface 45.

As a result, the angle of the light beam reflected by the first main surface 71 can be increased, so that the amount of light that is repeatedly reflected in the light guide panel 25E, deviates from the total reflection condition on the output surface 45, and is extracted can be increased. Further, it is possible to provide the image display device 21 increased in the amount of light and the head-up display 11 equipped with the image display device 21. Further, the amount of light emitted from the projection area for the display panel in the output surface 45 can be made uniform.

Further, in the present embodiment, the second main surface 73 has the plurality of prisms 51*a* inclined from the second main surface 73 toward the output surface 45.

Further, in the present embodiment, the output surface 45G has the third main surface 45Ga closer to the incident surface 43, and the fourth main surface 45Gb farther from the incident surface 43 than the third main surface 45Ga, and the third main surface 45Ga is inclined toward the display panel 31 side with respect to the fourth main surface 45Gb when viewed from the direction perpendicular to the light guide direction and the emission direction of the light in the incident surface. As a result, the amount of light that can be taken in from the light sources 41 can be increased.

Third Embodiment

Figure 24:
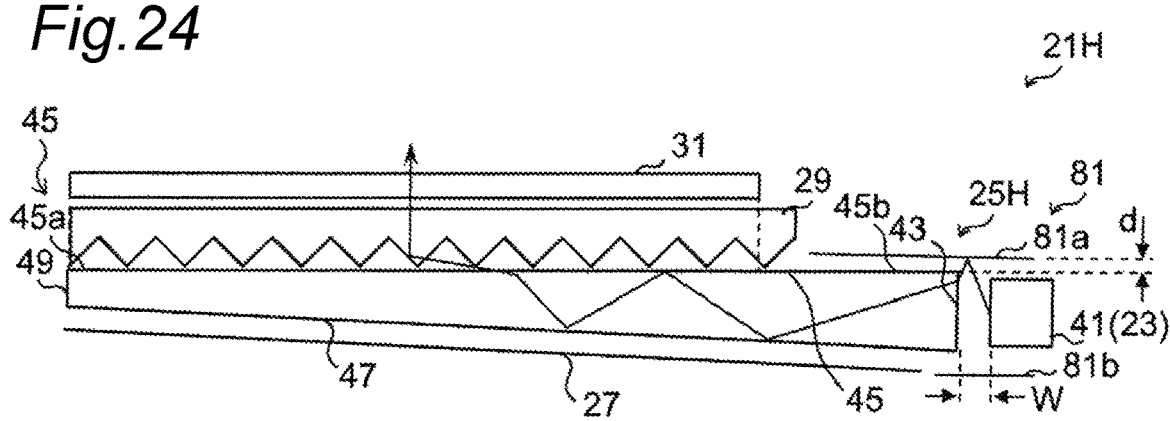
FIG. 24 is a schematic view of a cross section of an image display device according to the third embodiment.

Hereinafter, an image display device 21H of the third embodiment will be described with reference to FIG. 24. The image display device 21H of the third embodiment is different from the light guide panel 25 of the first embodiment in that a mirror 81 is provided between a light guide panel 25H and the light sources 41. In the third embodiment, members having the same configuration and function as those in the first embodiment are designated by the same reference numerals, and detailed description thereof and description of the same effects may be omitted.

[3-1. Configuration of Image Display Device]

The light source unit 23 is arranged at an interval from the light guide panel 25H. The mirror 81 that reflects the light emitted from the light source unit 23 and causes it to be incident on the light guide panel is provided between the light source unit 23 and the light guide panel 25H. The mirror 81 includes a first mirror 81*a* arranged on the output surface 45 side, and a second mirror 81*b* arranged on the bottom surface 47 side. The first mirror 81*a* is arranged so as to cover the gap between the light source unit 23 and the light guide panel 25H from the output surface 45 side. The second mirror 81*b* is arranged so as to cover the gap between the light source unit 23 and the light guide panel 25H from the bottom surface 47 side.

The thinner the light guide panel 25H is, the more chances that a light beam is reflected by the bottom surface 47 can be increased, and the extraction efficiency of the light incident on the light guide panel 25H can be improved. However, if the thickness of the light guide panel 25H is reduced, the amount of light directly incident from the light source unit 23 on the incident surface 43 of the light guide panel 25H is reduced. Therefore, by arranging the mirror 81 in the second direction of the light source unit 23, the light beam leaking from the light source unit 23 is reflected and caused to be incident on the incident surface 43 of the light guide panel 25H. As a result, the amount of light taken into the light guide panel 25H can be increased.

A distance d between the mirror 81 and the light guide panel 25H in the second direction may be small. Specifically, the distance d may be 0.5 mm or less. By extending the first mirror 81a along the output surface 45 to the vicinity of the light beam control member 29, the light beam emitted while deviating from the total reflection condition from the non-projection area 45b of the output surface 45 can be reflected and caused to be incident again into the light guide panel 25H from the output surface 45. As a result, the extraction efficiency of the light from the light guide panel 25H can be improved.

The second mirror 81b may be integrated with the specular reflector 27. As a result, the light beam leaking to the bottom surface 47 side can be efficiently guided to the projection area 45a of the light guide panel 25H.

[3-2. Effects, Etc.]

As described above, in the image display device 21H of the present embodiment, the light source unit 23 is arranged at an interval from the light guide panel 25H, and the mirror 81 that reflects the light emitted from the light source unit 23 is provided between the light source unit 23 and the light guide panel 25H.

As a result, the light beam that cannot be directly incident on the light guide panel 25H from the light source unit 23 can be reflected by the mirror 81 and caused to be incident on the light guide panel 25H, so that the amount of light taken into the light guide panel 25H can be increased. As a result, the amount of light emitted from the light guide panel 25H to the display panel 31 can be increased. In particular, when the distance W between the light sources 41 and the incident surface 43 is 1 mm and the thickness t of the incident surface 43 is thinner than 3.0 mm, the installation effect of the mirror 81 becomes large.

Further, the first mirror 81a is arranged on the output surface 45 side of the light guide panel 25H. As a result, the light beam leaking from the light source unit 23 to the output surface 45 side can be incident on the incident surface 43 of the light guide panel 25H.

Further, the second mirror 81b is arranged on the bottom surface 47 side of the light guide panel 25H. As a result, the light beam leaking from the light source unit 23 to the bottom surface 47 side can be incident on the incident surface 43 of the light guide panel 25H.

Fourth Embodiment

Figure 25:
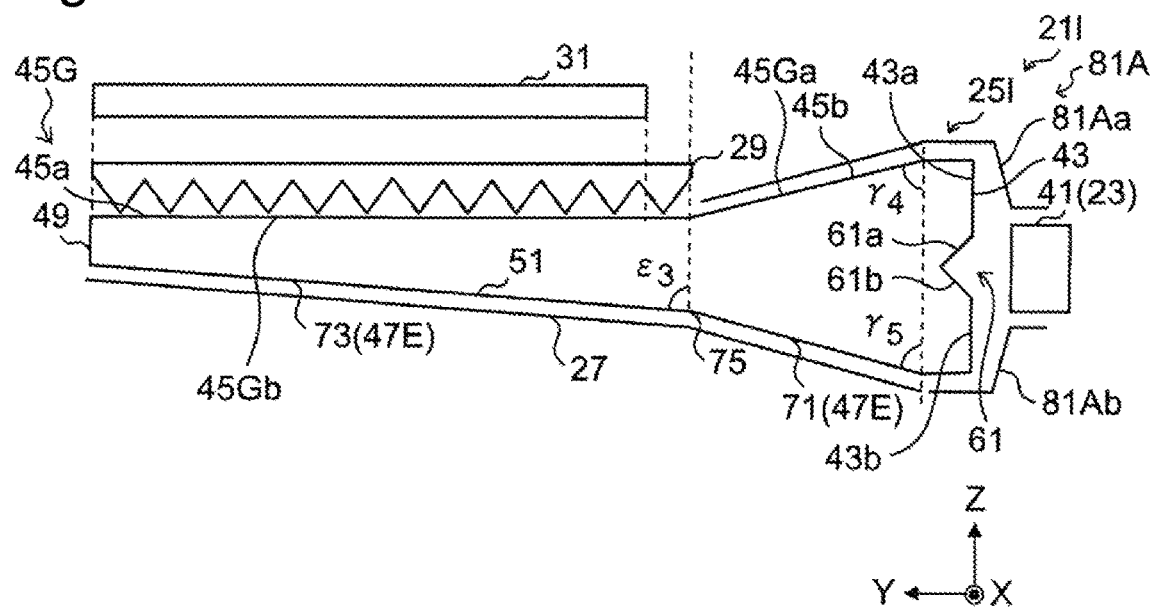
FIG. 25 is a schematic view of a cross section of an image display device according to the fourth embodiment.

Hereinafter, an image display device 21I of the fourth embodiment will be described with reference to FIG. 25. The image display device 21I of the fourth embodiment is obtained by combining the optical path refracting portion 61 of the first embodiment and the mirror 81 of the third embodiment to the light guide panel 25G of the second embodiment.

[4-1. Configuration]

The image display device 21I includes the light source unit 23 that irradiates light, a light guide panel 25I, the specular reflector 27 as a reflection member, the light beam control member 29, the display panel 31 that displays image, and a mirror 81A.

The light guide panel 25I has the incident surface 43 facing the light source unit 23, the output surface 45G facing the display panel 31, the bottom surface 47E, and the facing surface 49. The incident surface 43 is a side surface of the output surface 45, and includes, when viewed from the direction perpendicular to the light guide direction and the emission direction of the light in the incident surface 43, the first inclined surface 61a and the second inclined surface 61b, which are the parts of the incident surface 43 respectively, inclined with respect to the first incident surface 43a and the second incident surface 43b which are the remaining portions of the incident surface 43.

The bottom surface 47E has the first main surface 71 closer to the incident surface 43, and the second main surface 73 farther from the incident surface 43 than the first main surface 71. The first main surface 71 and the second main surface 73 are inclined with respect to the output surface 45. The first angle (90−γ5) between the first main surface 71 and the output surface 45 is larger than the second angle (90−ε3) between the second main surface 73 and the output surface 45. Further, the output surface 45G has the third main surface 45Ga closer to the incident surface 43, and the fourth main surface 45Gb farther from the incident surface 43 than the third main surface 45Ga. The third main surface 45Ga is inclined toward the display panel 31 side, that is, the side opposite to the light source unit 23 in the third direction with respect to the fourth main surface 45Gb.

The light source unit 23 is arranged at an interval from the light guide panel 25I. The mirror 81A that reflects the light emitted from the light source unit 23 and causes it to be incident on the light guide panel is provided between the light source unit 23 and the light guide panel 25I. The mirror 81A includes a first mirror 81Aa arranged on the output surface 45G side, and a second mirror 81Ab arranged on the bottom surface 47E side. The first mirror 81Aa is arranged along the third main surface 45Ga, the first incident surface 43a, and the light sources 41 so as to cover the gap between the light source unit 23 and the light guide panel 25I from the output surface 45G side. The second mirror 81Ab is arranged along the first main surface 71, the second incident surface 43b, and the light sources 41 so as to cover the gap between the light source unit 23 and the light guide panel 25I from the bottom surface 47 side.

[4-2. Effects, Etc.]

As described above, in the image display device 21I of the present embodiment, even if a light beam having a small emission angle is incident on the incident surface 43 of the light guide panel 25I from the light source unit 23, the refraction angle can be increased by passing through the first inclined surface 61a and the second inclined surface 61b. As a result, the light beam incident on the light guide panel 25I can be reflected in the light guide panel 25, and the amount of light extracted from the output surface 45G can be increased. Therefore, it is possible to provide the image display device 21I increased in the amount of light and the head-up display 11 equipped with the image display device 21I.

Further, the angle of the light beam reflected by the bottom surface 47E can be increased, and the total reflection condition is likely to be deviated on the output surface 45G, so that the amount of light emitted from the output surface 45G can be increased. As a result, it is possible to provide the image display device 21I further increased in the amount of light and the head-up display 11 equipped with the image display device 21I. Further, the amount of light emitted from the projection area for the display panel 31 in the output surface 45G can be made uniform.

Further, the light beam that cannot be directly incident on the light guide panel 25I from the light source unit 23 can be reflected by the mirror 81A and caused to be incident on the light guide panel 251, so that the amount of light taken into the light guide panel 251 can be increased. As a result, the amount of light emitted from the light guide panel 251 to the display panel 31 can be further increased.

Fifth Embodiment

Figure 26:
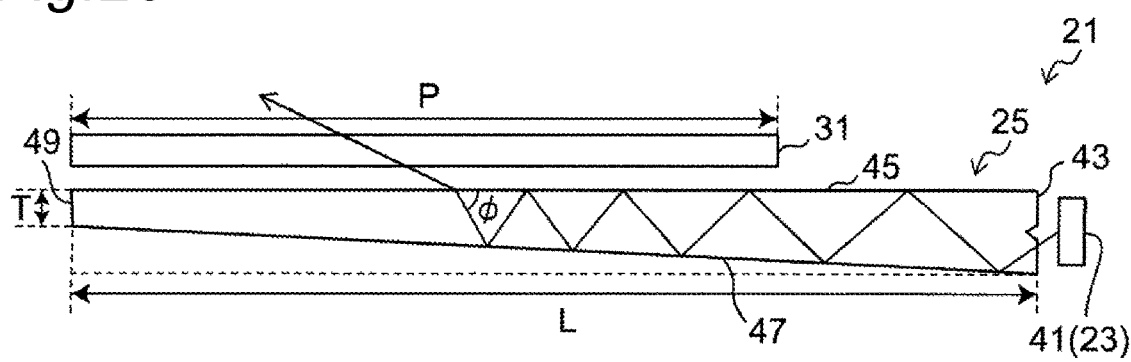
FIG. 26 is a schematic view of a cross section of an image display device according to the fifth embodiment.
Figure 27:
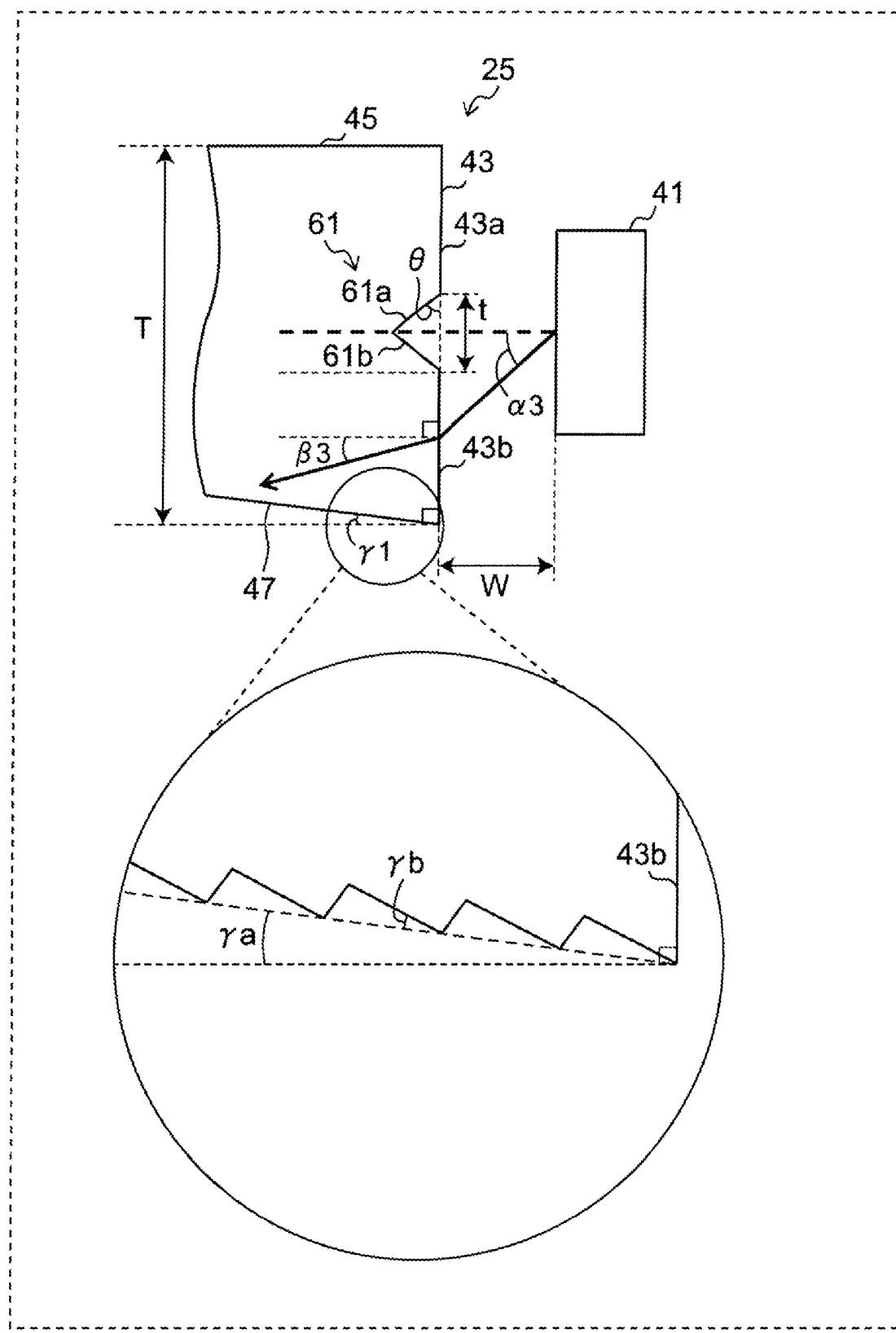
FIG. 27 is a schematic view of a partial cross section of a light guide panel according to the fifth embodiment.

Hereinafter, the fifth embodiment as a modified example of the image display device 21 of the first embodiment will be described with reference to FIGS. 26 and 27. The image display device 21 of the fifth embodiment sets the condition of the optical path in the light guide panel 25 of the first embodiment in more detail.

[5-1. Configuration]

The condition that the light emitted at the center of the used area of the display panel 31 is not incident on the first inclined surface 61a and the second inclined surface 61b on the incident surface 43 of the light guide panel 25 will be described. The angle $\alpha 3$ is an emission angle at which the light beam emitted from the light sources 41 is not incident on the first inclined surface 61a and the second inclined surface 61b. An angle $\beta 3$ is an angle between the light beam incident on the light guide panel 25 from the first incident surface 43a and the second incident surface 43b which are the remaining portions other than the optical path refracting portion 61 on the incident surface 43, and the line perpendicular to the first incident surface 43a and the second incident surface 43b.

The length t of the light guide panel 25 in the optical path refracting portion 61 in the thickness direction and the distance W between the light guide panel 25 and the light sources 41 satisfy the following equation (8).

$$t < 2W \tan(\alpha 3) \qquad \text{Eq. (8)}$$

When the equation (8) is satisfied, that is, when the length t of the optical path refracting portion 61 which is a concave portion is smaller than the value on the right side, the light emitted at the center of the used area of the display panel 31 is not incident on the optical path refracting portion 61.

As the light beam angle in the air, the refractive index n of the light guide panel 25, the angle $\alpha 3$, and the angle $\beta 3$ satisfy the following equation (9).

$$\alpha 3 = \arcsin(n \sin(\beta 3)) \qquad \text{Eq. (9)}$$

The following equation (10) is satisfied by using the rising angle $\gamma 1$ as the condition of the incident angle into the light guide panel 25 emitted to the center of the used area of the display panel 31. The rising angle $\gamma 1$ satisfies $\gamma 1 = \gamma a + \gamma b$. An angle $\gamma a$ is an inclination angle of the bottom surface, and $\gamma b$ is a prism angle of the prism structure on the bottom surface. For example, when the bottom surface is not inclined ($\gamma a = 0$), $\gamma 1 = \gamma b$, and the rising angle $\gamma 1$ is an angle of the prism having a prism structure.

$$T \arctan((\varphi + \beta 3)/2) \times (\varphi - \beta)/\gamma 1 = L - P/2 \qquad \text{Eq. (10)}$$

The following equation (11) is satisfied as a condition for the angle of total reflection breakage on the output surface 45.

$$\varphi = 90 - \arcsin(1/n) \qquad \text{Eq. (11)}$$

[5-2. Effects, Etc.]

As described above, since the image display device 21 of the present embodiment has the configuration that satisfies the conditions of the equations (8) to (11), in the present embodiment, the light emitted from the center of the used area of the display panel 31 when the optical path refracting portion 61 is not provided is emitted from the light sources 41, is incident on the first incident surface 43a and the second incident surface 43b, and is emitted from the center of the used area of the display panel 31. In this way, the light that is incident on the light guide panel 25 without being incident on the first inclined surface 61a and the second inclined surface 61b is also extracted from the used area of the display panel 31, so that the light utilization efficiency is not reduced by the optical path refracting portion 61. Therefore, it is possible to provide the image display device 21 increased in the amount of light and the head-up display 11 equipped with the image display device 21.

As described above, the first to fifth embodiments have been described as an example of the technology disclosed in the present application. However, the technology in the present disclosure is not limited to this, and is applicable to embodiments in which changes, replacements, additions, omissions, and the like are appropriately made. Further, each component described in the first to fifth embodiments can be combined to make a new embodiment. Therefore, other embodiments are described below.

In the above embodiments, the TFT transmissive liquid crystal panel is exemplified as the transmissive display panel 31, but other display elements can be used as long as it is a transmissive display device.

In the above embodiments, the light guide panel 25 or the light guide panel 25 and the display panel 31 are arranged so as to be parallel to each other, but they can also be arranged at an angle.

In the above embodiments, the LED is exemplified as the light source 41, but a laser diode, an organic light emitting diode, or the like can also be used.

In the above embodiments, the light sources 41 are arranged side by side in the long side direction of the display panel 31, but they can also be arranged side by side in the short side direction.

A moving body on which the head-up display 11 of the present embodiment is mounted is not limited to an automobile vehicle, but includes railroad vehicles, motorcycles, aircraft, helicopters, ships, and various other devices for transporting people.

As described above, the embodiments have been described as an example of the technology in the present disclosure. To that end, the accompanying drawings and the detailed description are provided.

Accordingly, some of the components described in the accompanying drawings and the detailed description may include not only essential components for solving the problem but also components which are not essential for solving the problem in order to describe the above technology. Therefore, the fact that those non-essential components are described in the accompanying drawings and the detailed description should not immediately mean that those non-essential components are essential.

Further, the above-described embodiments are provided to illustrate the technique in the present disclosure, and hence it is possible to make various changes, replacements, additions, omissions, and the like within the scope of claims or the equivalent thereof.

The present disclosure is applicable to image display devices. The present disclosure is also applicable to head-up displays.

EXPLANATIONS OF LETTERS OR NUMERALS

1 Vehicle
3 Windshield
11 Head-up display

13 Reflection optical unit
15 Housing
17 First mirror
19 Second mirror
21-21H Image display device
23 Light source unit
25-25H Light guide panel
27 Specular reflector
29 Light beam control member
31 Display panel
41 Light source
43 Incident surface
43a First incident surface
43b Second incident surface
45,45G Output surface
45a Projection area
45b Non-projection area
45Ga Third main surface
45Gb Fourth main surface
47,47E Bottom surface
49 Facing surface
51,53 Prism surface
51a,53a Prism
51b Seat surface
51c Inclined surface
61,61A,61B,61D Optical path refracting portion
61a,61Aa,61Da First inclined surface
61b,61Ab,61Bb,61Db Second inclined surface
61Ba Orthogonal surface
61Bb Inclined surface
63 Convex surface
65 Cylindrical shape portion
67 Protruding portion
71 First main surface
73 Second main surface
75 Boundary line
81 Mirror
81a First mirror
81b Second mirror
101 Light source
102 Light guide panel
103 Output surface
104 Incident surface
105 Bottom surface
Da Observer
Db Eyebox

The invention claimed is:

1. An image display device comprising:
a light source unit configured to irradiate light;
a display panel configured to display an image; and
a light guide panel configured to guide light emitted from the light source unit to the display panel,
wherein:
the light guide panel has an incident surface facing the light source unit, an output surface facing the display panel, and a bottom surface facing the output surface on a side opposite to the display panel;
the incident surface is a side surface of the light guide panel located between the output surface and the bottom surface;
a first direction is perpendicular to a light guide direction of light in the incident surface and an emission direction of light in the output surface;
the incident surface has a convex surface facing the light source unit, and a concave portion in which a part of the convex surface is recessed from remaining portions;
the concave portion extends in the first direction, has a predetermined length in the emission direction, faces a center of a light emitting surface of the light source unit, and is defined by a first inclined surface and a second inclined surface extending in the first direction only on the convex surface;
when viewed from the first direction, the incident surface has one concave portion, and a length t of the concave portion in a thickness direction, a distance W between the light source unit and the light guide panel, an emission angle α1 of a light beam from the light source unit toward the bottom surface, an angle β1 between the light beam and a perpendicular line with respect to the incident surface, a refractive index n of the light guide panel, a length L of the light guide panel, and a thickness T of the light guide panel on a facing surface facing the incident surface satisfy:

$t \geq 2W\tan(\alpha 1);$ $\alpha 1 = \arcsin\{n \sin(\beta 1)\};$ and $\beta 1 = \arctan(T/2L).$ 2. The image display device according to claim 1, wherein the concave portion is configured to intersect a perpendicular line from a center of the light source unit when viewed from the first direction.

3. The image display device according to claim 2, wherein:
the light source unit includes a plurality of light sources; and
the incident surface includes a plurality of convex surfaces so as to face the plurality of light sources, respectively.

4. The image display device according to claim 2, wherein the convex surface has a cylindrical shape.

5. The image display device according to claim 2, further comprising a mirror configured to reflect light emitted from the light source unit and cause the light to be incident on the light guide panel,
wherein:
the light source unit is arranged at an interval from the light guide panel; and
the mirror is arranged between the light source unit and the light guide panel.

6. The image display device according to claim 1, wherein the length t, the distance W, an emission angle α3 from the light source unit, the refractive index n, the length L, an angle φ between the output surface and a light beam transmitted through the output surface, an angle β3 between the light beam incident on the light guide panel from remaining portions other than the concave portion on the incident surface and a line perpendicular to the remaining portions other than the concave portion on the incident surface, a length P of the display panel, and a rising angle γ1 of the bottom surface satisfy:

$t < 2W\tan(\alpha 3);$ $\alpha 3 = \arcsin\{n \sin(\beta 3)\};$ $T \arctan\{(\varphi+\beta 3)/2\} \cdot (\varphi-\beta 3)/\gamma 1 = L - P/2;$ and $\varphi = 90 - \arcsin(1/n).$ 7. The image display device according to claim 1, wherein:
the light source unit includes a plurality of light sources; and the incident surface includes a plurality of convex surfaces so as to face the plurality of light sources, respectively.

8. The image display device according to claim 1, wherein the convex surface has a cylindrical shape.

9. The image display device according to claim 1, wherein the angle β1 and an angle θ between the first inclined surface and a first incident surface which is a remaining portion other than the concave portion on the incident surface satisfy:

$$\theta \geq \arctan[1+\sin(\beta1)/\{n\cos(\beta1)\}].$$

10. The image display device according to claim 1, further comprising a mirror configured to reflect light emitted from the light source unit and cause the light to be incident on the light guide panel,
wherein:
the light source unit is arranged at an interval from the light guide panel; and
the mirror is arranged between the light source unit and the light guide panel.

11. The image display device according to claim 10, wherein the mirror is arranged on an output surface side of the light guide panel.

12. The image display device according to claim 10, wherein the mirror is arranged on a side opposite to the output surface of the light guide panel.

13. A head-up display comprising the image display device according to claim 1.

14. A vehicle comprising the head-up display according to claim 13.

15. An image display device comprising:
a light source unit configured to irradiate light;
a display panel configured to display an image; and
a light guide panel configured to guide light emitted from the light source unit to the display panel,
wherein:
the light guide panel has an incident surface facing the light source unit, an output surface facing the display panel, and a bottom surface facing the output surface on a side opposite to the display panel;
the incident surface is a side surface of the light guide panel located between the output surface and the bottom surface;
a first direction is perpendicular to a light guide direction of light in the incident surface and an emission direction of light in the output surface;
the incident surface has a convex surface facing the light source unit, and a concave portion in which a part of the convex surface is recessed from remaining portions;
the concave portion extends in the first direction, has a predetermined length in the emission direction, faces a center of a light emitting surface of the light source unit, and is defined by a first inclined surface and a second inclined surface extending in the first direction only on the convex surface; and
when viewed from the first direction, the incident surface has one concave portion, and a length t of the concave portion in a thickness direction, a distance W between the light source unit and the light guide panel, an emission angle α2 of a light beam from the light source unit toward the output surface, an angle β2 between the light beam and a perpendicular line with respect to the incident surface, a refractive index n of the light guide panel, a length L of the light guide panel, and a thickness T of the light guide panel on a facing surface facing the incident surface satisfy:

$$t \geq 2W\tan(\alpha2);$$

$$\alpha2 = \arcsin\{n\sin(\beta2)\}; \text{ and}$$

$$\beta2 = \arctan(3T/2L).$$

16. The image display device according to claim 15, wherein the concave portion is configured to intersect a perpendicular line from a center of the light source unit when viewed from the first direction.

17. The image display device according to claim 15, wherein the length t, the distance W, an emission angle α3 from the light source unit, the refractive index n, the length L, an angle φ between the output surface and a light beam transmitted through the output surface, an angle β3 between the light beam incident on the light guide panel from remaining portions other than the concave portion on the incident surface and a line perpendicular to the remaining portions other than the concave portion on the incident surface, a length P of the display panel, and a rising angle γ1 of the bottom surface satisfy:

$$t < 2W\tan(\alpha3);$$

$$\alpha3 = \arcsin\{n\sin(\beta3)\};$$

$$T\arctan\{(\varphi+\beta3)/2\}\cdot(\varphi-\beta3)/\gamma1 = L-P/2; \text{ and}$$

$$\varphi = 90 - \arcsin(1/n).$$

18. An image display device comprising:
a light source unit configured to irradiate light;
a display panel configured to display an image; and
a light guide panel configured to guide light emitted from the light source unit to the display panel,
wherein:
the light guide panel has an incident surface facing the light source unit, an output surface facing the display panel, and a bottom surface facing the output surface on a side opposite to the display panel;
the incident surface is a side surface of the light guide panel located between the output surface and the bottom surface;
a first direction is perpendicular to a light guide direction of light in the incident surface and an emission direction of light in the output surface;
the incident surface has a protruding portion, a convex surface facing the light source unit, and a concave portion in which a part of the convex surface is recessed from remaining portions;
the concave portion extends in the first direction, has a predetermined length in the emission direction, faces a center of a light emitting surface of the light source unit, and is defined by a first inclined surface and a second inclined surface extending in the first direction only on the convex surface; and
the protruding portion: (i) is in contact with an outer peripheral surface in the first direction of the convex surface; (ii) extends toward the light source unit; and (iii) is configured to collimate light emitted from the light source unit.

* * * * *